US012387125B1

(12) United States Patent
Reagor et al.

(10) Patent No.: US 12,387,125 B1
(45) Date of Patent: Aug. 12, 2025

(54) LOW-FREQUENCY ACTIVATION OF SINGLE-QUBIT QUANTUM LOGIC GATES

(71) Applicant: Rigetti & Co, LLC, Berkeley, CA (US)

(72) Inventors: Matthew J. Reagor, San Rafael, CA (US); Nicolas Didier, Berkeley, CA (US); Gregory M. Stiehl, Ithaca, NY (US)

(73) Assignee: Rigetti & Co, LLC, Berkeley, CA (US)

( * ) Notice: Subject to any disclaimer, the term of this patent is extended or adjusted under 35 U.S.C. 154(b) by 635 days.

(21) Appl. No.: 17/859,823

(22) Filed: Jul. 7, 2022

Related U.S. Application Data

(60) Provisional application No. 63/219,222, filed on Jul. 7, 2021.

(51) Int. Cl.
*G06N 10/40* (2022.01)
*G06N 10/20* (2022.01)

(52) U.S. Cl.
CPC ............. *G06N 10/40* (2022.01); *G06N 10/20* (2022.01)

(58) Field of Classification Search
CPC .............................. G06N 10/40; G06N 10/20
See application file for complete search history.

(56) References Cited

U.S. PATENT DOCUMENTS

| | | | |
|---|---|---|---|
| 9,892,365 B2 | 2/2018 | Rigetti et al. | |
| 10,056,908 B2 | 8/2018 | Rigetti et al. | |
| 10,352,992 B1 | 7/2019 | Zeng et al. | |
| 10,483,980 B2 | 11/2019 | Sete et al. | |
| 2016/0292586 A1 | 10/2016 | Rigetti et al. | |
| 2017/0230050 A1 | 8/2017 | Rigetti et al. | |
| 2019/0007051 A1* | 1/2019 | Sete | H03K 19/195 |
| 2019/0392344 A1* | 12/2019 | Kelly | G06N 10/40 |

OTHER PUBLICATIONS

Nakamura, et al., "Rabi Oscillations in a Josephson-Junction Charge Two-Level System", Phys.Rev.Lett., Dec. 10, 2001, 4 pgs.
Wang, et al., "Cavity Attenuators for Superconducting Qubits", Phys.Rev.Applied, Jan. 16, 2019, 9 pgs.
Caldwell, et al., "Parametrically Activated Entangling Gates Using Transmon Qubits", arXiv:1706.06562v2 [quant-oh], Dec. 8, 2017, 7 pgs.
Fried, et al., "Assessing the Influence of Broadband Instrumentation Noise on Parametrically Modulated Superconducting Qubits", arXiv:1908.11370v1, Aug. 29, 2019, 6 pgs.

(Continued)

*Primary Examiner* — Nghia M Doan
(74) *Attorney, Agent, or Firm* — Henry Patent Law Firm PLLC

(57) ABSTRACT

In a general aspect, a parametrically activated single-qubit quantum logic gate is performed in a quantum computing system. In some cases, a superconducting quantum processing unit includes a tunable qubit device. A single-qubit quantum logic gate is performed on a qubit defined by the tunable qubit device by communicating one or more control signals from a control system to the tunable qubit device. The tunable qubit device has a range of qubit operating frequencies, and the one or more control signals include only frequencies that are below the range of qubit operating frequencies.

26 Claims, 12 Drawing Sheets

(56) References Cited

OTHER PUBLICATIONS

Houck, et al., "Life after charge noise: recent results with transmon qubits", arXiv:0812.1865v1, Dec. 10, 2008, 6 pgs.
Kono, et al., "Breaking the trade-off between fast control and long lifetime of a superconducting qubit", arXiv:2002.01635v2, Mar. 9, 2020, 22 pgs.
Leonard, et al., "Digital coherent control of a superconducting qubit", arXiv:1806.07930v1, Jun. 20, 2018, 13 pgs.
Naik, et al., "Random access quantum information processors", arXiv:1705:00579, May 1, 2017, 7 pgs.
Scarlino, et al., "Second harmonic coherent driving of a spin qubit in a Si/SiGe quantum dot", arXiv:1504.06436v1, Apr. 24, 2015, 9 pgs.
Wallraff, et al., "sideband Transitions and Two-Tone Spectroscopy of a Superconducting Qubit Strongly Coupled to an On-Chip Cavity", PRL 99, 050501, Jul. 30, 2007, 4 pgs.
Zhang, et al., "Universal fast flux control of a coherent, low-frequency qubit", arXiv:2002.10653v1, Feb. 25, 2020, 12 pgs.

\* cited by examiner

LOW-FREQUENCY ACTIVATION OF SINGLE-QUBIT QUANTUM LOGIC GATES

CROSS-REFERENCE TO RELATED APPLICATIONS

This application claims priority to U.S. Provisional Patent Application No. 63/219,222, filed Jul. 7, 2021, entitled "Low-Frequency Parametrically Activated Single-Qubit Quantum Logic Gates." The above-referenced priority document is incorporated herein by reference in its entirety.

BACKGROUND

The following description relates to performing single-qubit quantum logic gates using low frequency activation.

Quantum computers can perform computational tasks by executing quantum algorithms. Quantum algorithms are often expressed as a quantum circuit that operates on qubits. In some quantum computing architectures, the quantum circuits are implemented as a series of quantum logic gates, which may include single-qubit gates and two-qubit gates, for example.

DETAILED DESCRIPTION

Figure 1:
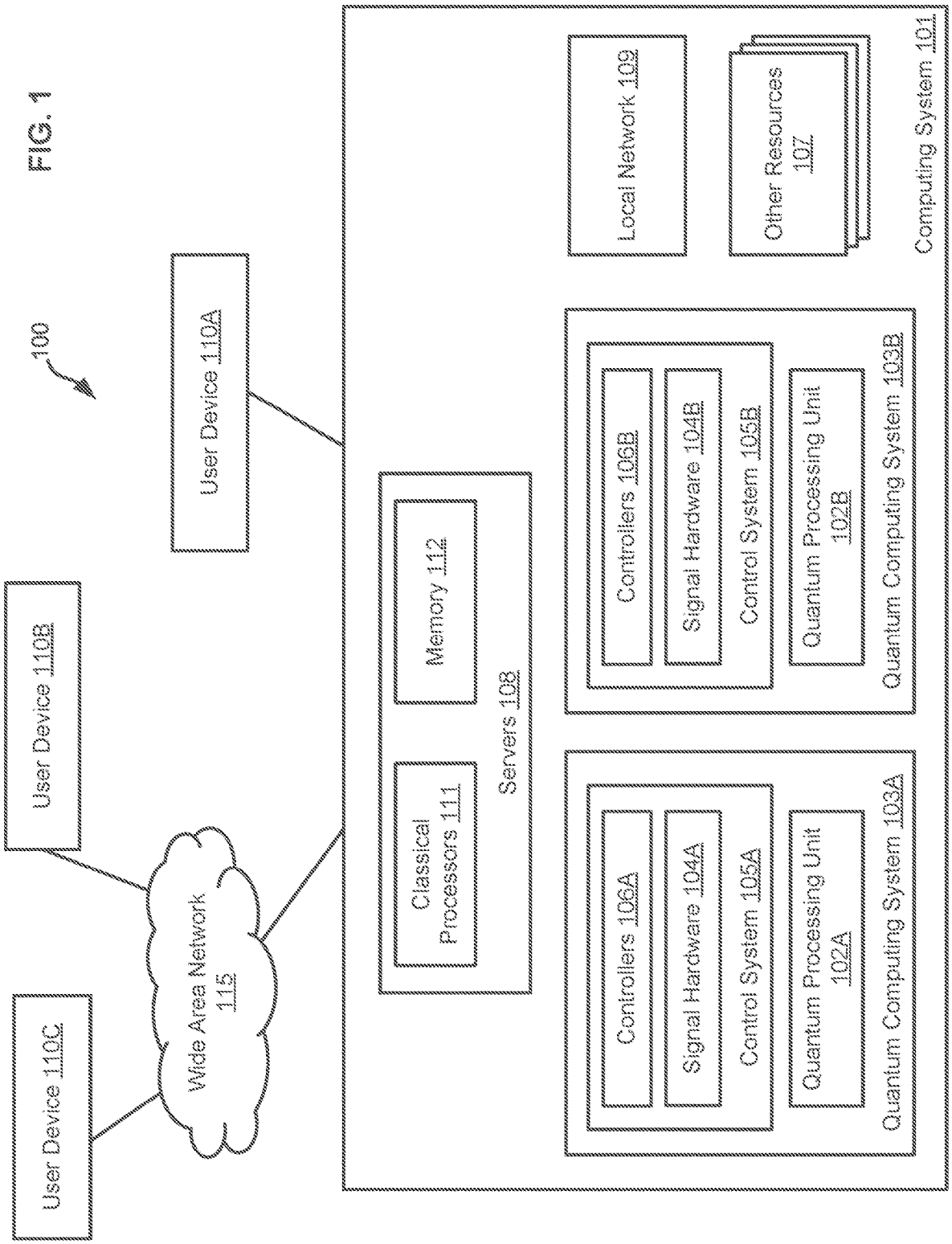
FIG. 1 is a block diagram of an example quantum computing system.

In some aspects of what is described, a single-qubit control operation, such as a single-qubit quantum logic gate, is parametrically activated and performed by operating a tunable qubit device. The single-qubit quantum logic gate can be used, for instance, in quantum computing systems to perform computational tasks. In some systems, a set of parametrically activated single-qubit quantum logic gates can form a subset of universal quantum logic gates, which can be used to execute quantum algorithms. In some instances, quantum logic gates can be implemented in a scalable architecture to achieve a scalable quantum computing system.

In some implementations, the systems and techniques described here can provide technical advantages and improvements. In some cases, parametrically activated quantum logic gates are easier to tune and characterize, and may have a higher on/off ratio, higher fidelity, and faster gate time, compared to quantum logic gates that are activated in another manner. For instance, the gate time for a parametrically activated quantum logic gate may be controlled by parameters of control signals, and therefore the quantum logic gate may be made faster by adjusting the external control parameters, e.g., modulation amplitude and modulation frequency of a flux modulation signal. Moreover, control signals including only frequency components (e.g., in a RF or microwave regime) less than the minimum qubit operating frequency of the tunable qubit device can be more robust to, or even immune to, certain control imperfections (e.g., errors associated with fast DC pulses, flux noise, etc.). The systems and techniques presented here may enable quantum processing units with a higher spatial density of qubit devices, a higher spatial density of qubit frequencies (e.g., more frequency crowding may be tolerated), and lower control overhead (e.g., fewer devices or signal processing components to control per operation).

In some implementations, the systems and techniques described here can provide technical advantages and improvements at a system level. For example, the systems and techniques described here can enable simultaneous achievement of quantum coherence and addressability to qubit devices. In some implementations, the systems and techniques described here can provide an effective solution when control signals are delivered from control electronics located at room temperature to superconducting quantum processing units located at cryogenic temperature in order to drive quantum logic gates with low-error rates. For example, the systems and techniques described here may allow opportunities to enable high-density (e.g., one or more transmission lines per millimeter square) microwave transmission systems for quantum processing units. The systems and techniques described here can allow the opportunity to build single processing components and perform signal processing (e.g., filtering or another processing) at cryogenic temperatures; and assembling precision electronics for quantum logic gate control at low cost. The systems and techniques described here may enable low reflections up to the operating frequencies of superconducting qubit devices (e.g., 4-8 GHz) and thus impedance matching across high temperature gradients (e.g., from 300 K to 10 mK). In some instances, the systems and techniques described here also can reduce cooling power from the cryogenic system. In some cases, a combination of these and potentially other advantages and improvements may be obtained.

FIG. 1 is a block diagram of an example computing environment 100. The example computing environment 100 shown in FIG. 1 includes a computing system 101 and user devices 110A, 110B, 110C. A computing environment may include additional or different features, and the components of a computing environment may operate as described with respect to FIG. 1 or in another manner.

The example computing system 101 includes classical and quantum computing resources and exposes their functionality to the user devices 110A, 110B, 110C (referred to collectively as "user devices 110"). The computing system 101 shown in FIG. 1 includes one or more servers 108, quantum computing systems 103A, 103B, a local network 109, and other resources 107. The computing system 101 may also include one or more user devices (e.g., the user device 110A) as well as other features and components. A computing system may include additional or different features, and the components of a computing system may operate as described with respect to FIG. 1 or in another manner.

The example computing system 101 can provide services to the user devices 110, for example, as a cloud-based or remote-accessed computer system, as a distributed computing resource, as a supercomputer or another type of high-performance computing resource, or in another manner. The computing system 101 or the user devices 110 may also have access to one or more other quantum computing systems (e.g., quantum computing resources that are accessible through the wide area network 115, the local network 109, or otherwise).

The user devices 110 shown in FIG. 1 may include one or more classical processor, memory, user interfaces, communication interfaces, and other components. For instance, the user devices 110 may be implemented as laptop computers, desktop computers, smartphones, tablets, or other types of computer devices. In the example shown in FIG. 1, to access computing resources of the computing system 101, the user devices 110 send information (e.g., programs, instructions, commands, requests, input data, etc.) to the servers 108; and in response, the user devices 110 receive information (e.g., application data, output data, prompts, alerts, notifications, results, etc.) from the servers 108. The user devices 110 may access services of the computing system 101 in another manner, and the computing system 101 may expose computing resources in another manner.

In the example shown in FIG. 1, the local user device 110A operates in a local environment with the servers 108 and other elements of the computing system 101. For instance, the user device 110A may be co-located with the servers 108 and possibly other elements of the computing system 101. As shown in FIG. 1, the user device 110A communicates with the servers 108 through a local data connection.

The local data connection in FIG. 1 is provided by the local network 109. For example, some or all of the servers 108, the user device 110A, the quantum computing systems 103A, 103B and the other resources 107 may communicate with each other through the local network 109. In some implementations, the local network 109 operates as a communication channel that provides one or more low-latency communication pathways from the server 108 to the quantum computer systems 103A, 103B (or to one or more of the elements of the quantum computer systems 103A, 103B). The local network 109 can be implemented, for instance, as a wired or wireless Local Area Network, an Ethernet connection, or another type of wired or wireless connection. The local network 109 may include one or more wired or wireless routers, wireless access points (WAPs), wireless mesh nodes, switches, high-speed cables, or a combination of these and other types of local network hardware elements. In some cases, the local network 109 includes a software-defined network that provides communication among virtual resources, for example, among an array of virtual machines operating on the server 108 and possibly elsewhere.

In the example shown in FIG. 1, the remote user devices 110B, 110C operate remote from the servers 108 and other elements of the computing system 101. For instance, the user devices 110B, 110C may be located at a remote distance from the servers 108 and possibly other elements of the computing system 101. As shown in FIG. 1, each of the user devices 110B, 110C communicates with the servers 108 through a remote data connection.

The remote data connection in FIG. 1 is provided by a wide area network 115, which may include, for example, the Internet or another type of wide area communication network. In some cases, remote user devices use another type of remote data connection (e.g., satellite-based connections, a cellular network, a virtual private network, etc.) to access the servers 108. The wide area network 115 may include one or more internet servers, firewalls, service hubs, base stations, or a combination of these and other types of remote networking elements. Generally, the computing environment 100 can be accessible to any number of remote user devices.

The example servers 108 shown in FIG. 1 can manage interaction with the user devices 110 and utilization of the quantum and classical computing resources in the computing system 101. For example, based on information from the user devices 110, the servers 108 may delegate computational tasks to the quantum computing systems 103A, 103B and the other resources 107; the servers 108 can then send information to the user devices 110 based on output data from the computational tasks performed by the quantum computing systems 103A, 103B and the other resources 107.

As shown in FIG. 1, the servers 108 are classical computing resources that include classical processors 111 and memory 112. The servers 108 may also include one or more communication interfaces that allow the servers to communicate via the local network 109, the wide area network 115, and possibly other channels. In some implementations, the servers 108 may include a host server, an application server, a virtual server, or a combination of these and other types of servers. The servers 108 may include additional or different features, and may operate as described with respect to FIG. 1 or in another manner.

The classical processors 111 can include various kinds of apparatus, devices, and machines for processing data, including, by way of example, a microprocessor, a central processing unit (CPU), a graphics processing unit (GPU), an FPGA (field programmable gate array), an ASIC (application specific integrated circuit), or combinations of these. The memory 112 can include, for example, a random-access memory (RAM), a storage device (e.g., a writable read-only memory (ROM) or others), a hard disk, or another type of storage medium. The memory 112 can include various forms of volatile or non-volatile memory, media and memory devices, etc.

Each of the example quantum computing systems 103A, 103B operates as a quantum computing resource in the computing system 101. The other resources 107 may include additional quantum computing resources (e.g., quantum computing systems, quantum simulators, or both) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the servers 108 generate programs, identify appropriate computing resources (e.g., a QPU or QVM) in the computing system 101 to execute the programs, and send the programs to the identified resources for execution. For example, the servers 108 may send programs to the quantum computing system 103A, the quantum computing system 103B, or any of the other resources 107. The programs may include classical programs, quantum programs, hybrid classical/quantum programs, and may include any type of function, code, data, instruction set, etc.

In some instances, programs can be formatted as source code that can be rendered in human-readable form (e.g., as text) and can be compiled, for example, by a compiler running on the servers 108, on the quantum computing systems 103, or elsewhere. In some instances, programs can be formatted as compiled code, such as, for example, binary code (e.g., machine-level instructions) that can be executed directly by a computing resource. Each program may include instructions corresponding to computational tasks that, when performed by an appropriate computing resource, generate output data based on input data. For example, a program can include instructions formatted for a quantum computer system, a simulator, a digital microprocessor, co-processor or other classical data processing apparatus, or another type of computing resource.

In some cases, a program may be expressed in a hardware-independent format. For example, quantum machine instructions may be provided in a quantum instruction language such as Quil, described in the publication "A Practical Quantum Instruction Set Architecture," arXiv: 1608.03355v2, dated Feb. 17, 2017, or another quantum instruction language. For instance, the quantum machine instructions may be written in a format that can be executed by a broad range of quantum processing units or simulators. In some cases, a program may be expressed in high-level terms of quantum logic gates or quantum algorithms, in lower-level terms of fundamental qubit rotations and controlled rotations, or in another form. In some cases, a program may be expressed in terms of control signals (e.g., pulse sequences, delays, etc.) and parameters for the control signals (e.g., frequencies, phases, durations, channels, etc.). In some cases, a program may utilize Quil-T, described in the publication "Gain deeper control of Rigetti quantum processors with Quil-T," available at https://medium.com/ rigetti/gain-deeper-control-of-rigetti-quantum-processors-with-quil-t-ea8943061e5b dated Dec. 10, 2020. In some cases, a program may be expressed in another form or format.

In some implementations, the servers 108 include one or more compilers that convert programs between formats. For example, the servers 108 may include a compiler that converts hardware-independent instructions to binary programs for execution by the quantum computing systems 103A, 103B. In some cases, a compiler can compile a program to a format that targets a specific quantum resource in the computer system 101. For example, a compiler may generate a different binary program (e.g., from the same source code) depending on whether the program is to be executed by the quantum computing system 103A or the quantum computing system 103B.

In some cases, a compiler generates a partial binary program that can be updated, for example, based on specific parameters. For instance, if a quantum program is to be executed iteratively on a quantum computing system with varying parameters on each iteration, the compiler may generate the binary program in a format that can be updated with specific parameter values at runtime (e.g., based on feedback from a prior iteration, or otherwise); the parametric update can be performed without further compilation. In some cases, a compiler generates a full binary program that does not need to be updated or otherwise modified for execution.

In some implementations, the servers 108 generate a schedule for executing programs, allocate computing resources in the computing system 101 according to the schedule, and delegate the programs to the allocated computing resources. The servers 108 can receive, from each computing resource, output data from the execution of each program. Based on the output data, the servers 108 may generate additional programs that are then added to the schedule, output data that is provided back to a user device 110, or perform another type of action.

In some implementations, all or part of the computing environment operates as a cloud-based quantum computing (QC) environment, and the servers 108 operate as a host system for the cloud-based QC environment. The cloud-based QC environment may include software elements that operate on both the user devices 110 and the computer system 101 and interact with each other over the wide area network 115. For example, the cloud-based QC environment may provide a remote user interface, for example, through a browser or another type of application on the user devices 110. The remote user interface may include, for example, a graphical user interface or another type of user interface that obtains input provided by a user of the cloud-based QC environment. In some cases the remote user interface includes, or has access to, one or more application programming interfaces (APIs), command line interfaces, graphical user interfaces, or other elements that expose the services of the computer system 101 to the user devices 110.

In some cases, the cloud-based QC environment may be deployed in a "serverless" computing architecture. For instance, the cloud-based QC environment may provide on-demand access to a shared pool of configurable computing resources (e.g., networks, servers, storage, applications, services, quantum computing resources, classical computing resources, etc.) that can be provisioned for requests from user devices 110. Moreover, the cloud-based computing systems 101 may include or utilize other types of computing resources, such as, for example, edge computing, fog computing, etc.

In an example implementation of a cloud-based QC environment, the servers 108 may operate as a cloud provider that dynamically manages the allocation and provisioning of physical computing resources (e.g., GPUs, CPUs, QPUs, etc.). Accordingly, the servers 108 may provide services by defining virtualized resources for each user account. For instance, the virtualized resources may be formatted as virtual machine images, virtual machines, containers, or virtualized resources that can be provisioned for a user account and configured by a user. In some cases, the servers 108 include a container management and execution system that is implemented, for example, using KUBERNETES® or another software platform for container management. In some cases, the cloud-based QC environment is implemented, for example, using OPEN-STACK® or another software platform for cloud-based computing that can be used to provide virtual servers and other virtual computing resources for users.

In some cases, the server 108 stores quantum machine images (QMI) for each user account. A quantum machine image may operate as a virtual computing resource for users of the cloud-based QC environment. For example, a QMI can provide a virtualized development and execution environment to develop and run programs (e.g., quantum programs or hybrid classical/quantum programs). When a QMI operates on the server 108, the QMI may engage either of the quantum processor units 102A, 102B, and interact with a remote user device (110B or 110C) to provide a user programming environment. The QMI may operate in close physical proximity to, and have a low-latency communication link with, the quantum computing systems 103A, 103B. In some implementations, remote user devices connect with QMIs operating on the servers 108 through secure shell (SSH) or other protocols over the wide area network 115.

In some implementations, all or part of the computing system 101 operates as a hybrid computing environment. For example, quantum programs can be formatted as hybrid classical/quantum programs that include instructions for execution by one or more quantum computing resources and instructions for execution by one or more classical resources. The servers 108 can allocate quantum and classical computing resources in the hybrid computing environment, and delegate programs to the allocated computing resources for execution. The quantum computing resources in the hybrid environment may include, for example, one or more quantum processing units (QPUs), one or more quantum simulators, or possibly other types of quantum resources. The classical computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some cases, the servers 108 can select the type of computing resource (e.g., quantum or classical) to execute an individual program, or part of a program, in the computing system 101. For example, the servers 108 may select a particular quantum processing unit (QPU) or other computing resource based on availability of the resource, speed of the resource, information or state capacity of the resource, a performance metric (e.g., process fidelity) of the resource, or based on a combination of these and other factors. In some cases, the servers 108 can perform load balancing, resource testing and calibration, and other types of operations to improve or optimize computing performance.

Each of the example quantum computing systems 103A, 103B shown in FIG. 1 can perform quantum computational tasks by executing quantum machine instructions (e.g., a binary program compiled for the quantum computing system). In some implementations, a quantum computing system can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, a quantum computing system can operate using gate-based models for quantum computing. For example, the qubits can be initialized in an initial state, and a quantum logic circuit comprised of a series of quantum logic gates can be applied to transform the qubits and extract measurements representing the output of the quantum computation. Individual qubits may be controlled by single-qubit quantum logic gates, and pairs of qubits may be controlled by two-qubit quantum logic gates (e.g., entangling gates that are capable of generating entanglement between the pair of qubits). In some implementations, a quantum computing system can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation. Other computational regimes may be used; for example, quantum computing systems may operate in non-fault-tolerant regimes. In some implementations, a quantum computing system is constructed and operated according to a scalable quantum computing architecture. For example, in some cases, the architecture can be scaled to a large number of qubits to achieve large-scale general purpose coherent quantum computing. Other architectures may be used; for example, quantum computing systems may operate in small-scale or non-scalable architectures.

The example quantum computing system 103A shown in FIG. 1 includes a quantum processing unit 102A and a control system 105A, which controls the operation of the quantum processing unit 102A. Similarly, the example quantum computing system 103B includes a quantum processing unit 102B and a control system 105B, which controls the operation of a quantum processing unit 102B. A quantum computing system may include additional or different features, and the components of a quantum computing system may operate as described with respect to FIG. 1 or in another manner.

In some instances, all or part of the quantum processing unit 102A functions as a quantum processor, a quantum memory, or another type of subsystem. In some examples, the quantum processing unit 102A includes a quantum circuit system. The quantum circuit system may include qubit devices, readout devices, and possibly other devices that are used to store and process quantum information. In some cases, the quantum processing unit 102A includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processing unit 102A. In some cases, the quantum processing unit 102A includes an ion trap system, and the qubit devices are implemented as trapped ions controlled by optical signals delivered to the quantum processing unit 102A. In some cases, the quantum processing unit 102A includes a spin system, and the qubit devices are implemented as nuclear or electron spins controlled by microwave or radio-frequency signals delivered to the quantum processing unit 102A. The quantum processing unit 102A may be implemented based on another physical modality of quantum computing.

The quantum processing unit 102A may include, or may be deployed within, a controlled environment. The controlled environment can be provided, for example, by shielding equipment, cryogenic equipment, and other types of environmental control systems. In some examples, the components in the quantum processing unit 102A operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperatures, etc.

In some implementations, the example quantum processing unit 102A can process quantum information by applying control signals to the qubits in the quantum processing unit 102A. The control signals can be configured to encode information in the qubits, to process the information by performing quantum logic gates or other types of operations, or to extract information from the qubits. In some examples, the operations can be expressed as single-qubit quantum logic gates, two-qubit quantum logic gates, or other types of quantum logic gates that operate on one or more qubits. A quantum logic circuit, which includes a sequence of quantum logic operations, can be applied to the qubits to perform a quantum algorithm. The quantum algorithm may correspond to a computational task, a hardware test, a quantum error correction procedure, a quantum state distillation procedure, or a combination of these and other types of operations.

The example control system 105A includes controllers 106A and signal hardware 104A. Similarly, control system 105B includes controllers 106B and signal hardware 104B. All or part of the control systems 105A, 105B can operate in a room-temperature environment or another type of environment, which may be located near the respective quantum processing units 102A, 102B. In some cases, the control systems 105A, 105B include classical computers, signaling equipment (microwave, radio, optical, bias, etc.), electronic systems, vacuum control systems, refrigerant control systems, or other types of control systems that support operation of the quantum processing units 102A, 102B.

The control systems 105A, 105B may be implemented as distinct systems that operate independent of each other. In some cases, the control systems 105A, 105B may include one or more shared elements; for example, the control systems 105A, 105B may operate as a single control system that operates both quantum processing units 102A, 102B. Moreover, a single quantum computer system may include multiple quantum processing units, which may operate in the same controlled (e.g., cryogenic) environment or in separate environments.

The example signal hardware 104A includes components that communicate with the quantum processing unit 102A. The signal hardware 104A may include, for example, waveform generators, amplifiers, digitizers, high-frequency sources, DC sources, AC sources, etc. The signal hardware may include additional or different features and components. In the example shown, components of the signal hardware 104A are adapted to interact with the quantum processing unit 102A. For example, the signal hardware 104A can be configured to operate in a particular frequency range, configured to generate and process signals in a particular format, or the hardware may be adapted in another manner.

In some instances, one or more components of the signal hardware 104A generate control signals, for example, based on control information from the controllers 106A. The control signals can be delivered to the quantum processing unit 102A during operation of the quantum computing system 103A. For instance, the signal hardware 104A may generate signals to implement quantum logic operations, readout operations, or other types of operations. As an example, the signal hardware 104A may include arbitrary waveform generators (AWGs) that generate electromagnetic waveforms (e.g., microwave or radio-frequency) or laser systems that generate optical waveforms. The waveforms or other types of signals generated by the signal hardware 104A can be delivered to devices in the quantum processing unit 102A to operate qubit devices, readout devices, bias devices, coupler devices, or other types of components in the quantum processing unit 102A.

In some instances, the signal hardware 104A receives and processes signals from the quantum processing unit 102A. The received signals can be generated by the execution of a quantum program on the quantum computing system 103A. For instance, the signal hardware 104A may receive signals from the devices in the quantum processing unit 102A in response to readout or other operations performed by the quantum processing unit 102A. Signals received from the quantum processing unit 102A can be mixed, digitized, filtered, or otherwise processed by the signal hardware 104A to extract information, and the information extracted can be provided to the controllers 106A or handled in another manner. In some examples, the signal hardware 104A may include a digitizer that digitizes electromagnetic waveforms (e.g., microwave or radio-frequency) or optical signals, and a digitized waveform can be delivered to the controllers 106A or to other signal hardware components. In some instances, the controllers 106A process the information from the signal hardware 104A and provide feedback to the signal hardware 104A; based on the feedback, the signal hardware 104A can in turn generate new control signals that are delivered to the quantum processing unit 102A.

In some implementations, the signal hardware 104A includes signal delivery hardware that interfaces with the quantum processing unit 102A. For example, the signal hardware 104A may include filters, attenuators, directional couplers, multiplexers, diplexers, bias components, signal channels, isolators, amplifiers, power dividers, and other types of components. In some instances, the signal delivery hardware performs preprocessing, signal conditioning, or other operations to the control signals to be delivered to the quantum processing unit 102A. In some instances, signal delivery hardware performs preprocessing, signal conditioning, or other operations on readout signals received from the quantum processing unit 102A.

Figure 2:
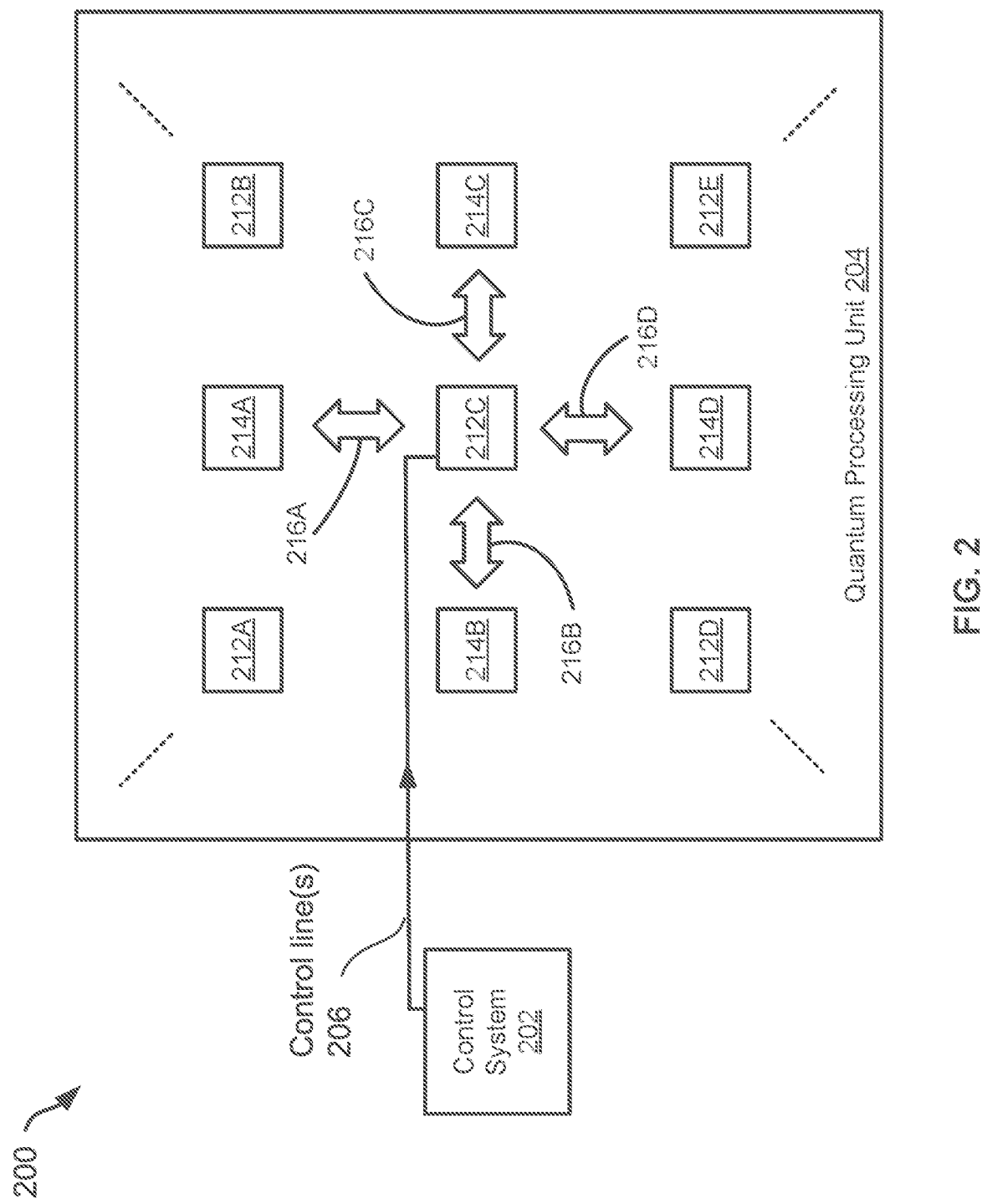
FIG. 2 is a schematic diagram showing aspects of an example quantum computing system.
Figure 3A:
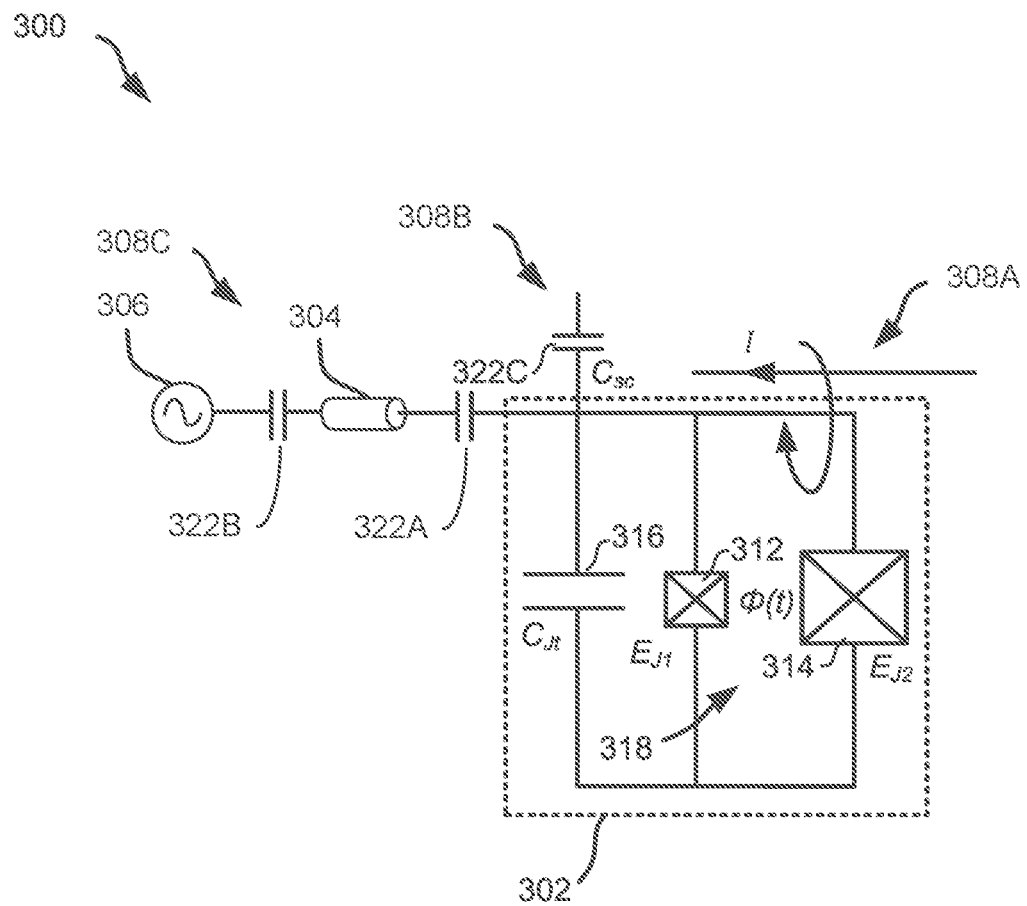
FIG. 3A is a circuit diagram showing an example equivalent circuit of a tunable qubit device in a superconducting quantum processing unit.
Figure 3B:
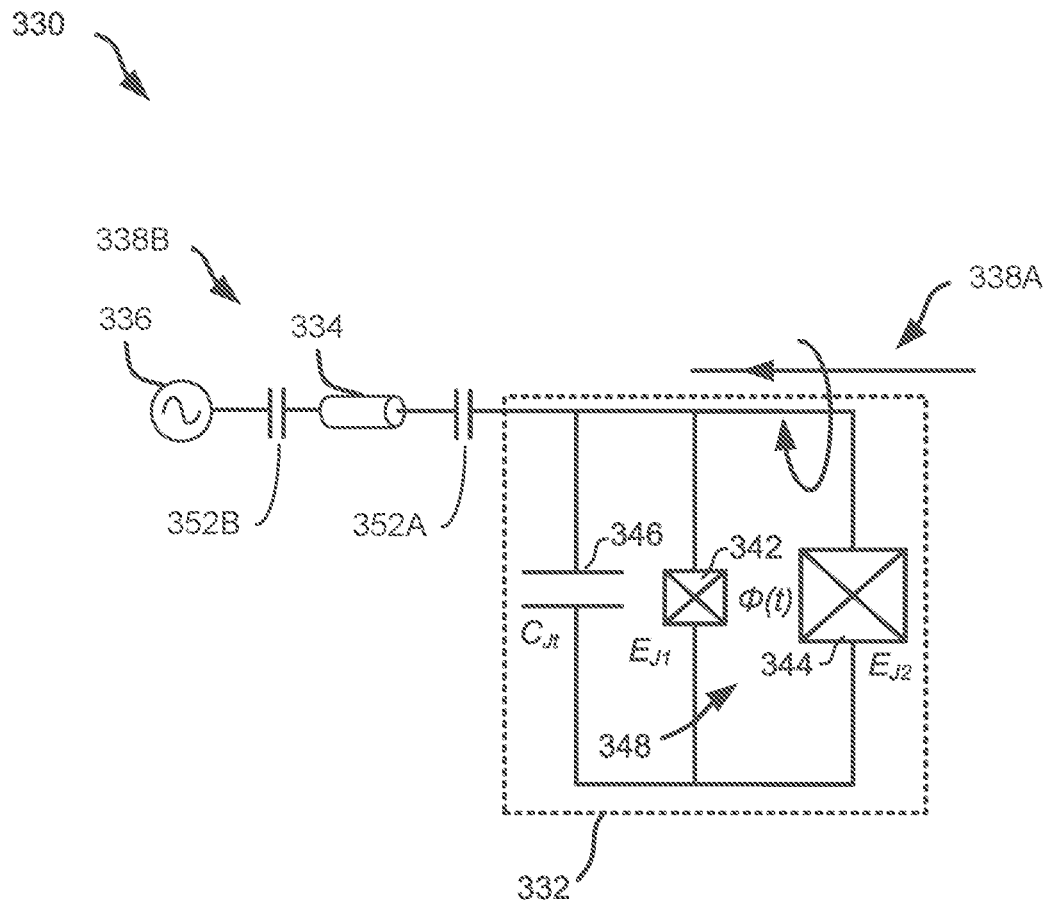
FIG. 3B is a circuit diagram showing an example equivalent circuit of a tunable qubit device in a superconducting quantum processing unit.

In some implementations, the quantum processing unit 102A includes one or more tunable qubit devices, which may be implemented as the tunable qubit devices 212A, 212B, 212C, 212D, 212E, 302, 332 shown in FIGS. 2, 3A, 3B, or in another manner. In some implementations, the signal hardware 104A includes a control line, which may be implemented as the control line 206, the flux bias control line 308A, the qubit drive control line 308B, the readout control line 308C, the combined flux bias and qubit control line 338A as shown in FIGS. 2, 3A, and 3B or in another manner.

The example controllers 106A communicate with the signal hardware 104A to control operation of the quantum computing system 103A. The controllers 106A may include classical computing hardware that directly interface with components of the signal hardware 104A. The example controllers 106A may include classical processors, memory, clocks, digital circuitry, analog circuitry, and other types of systems or subsystems. The classical processors may include one or more single- or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory or another type of computer storage medium. The controllers 106A may also include one or more communication interfaces that allow the controllers 106A to communicate via the local network 109 and possibly other channels. The controllers 106A may include additional or different features and components.

In some implementations, the controllers 106A include memory or other components that store quantum state information, for example, based on qubit readout operations performed by the quantum computing system 103A. For instance, the states of one or more qubits in the quantum processing unit 102A can be measured by qubit readout operations, and the measured state information can be stored in a cache or other types of memory systems in one or more of the controllers 106A. In some cases, the measured state information is subsequently used in the execution of a quantum program, a quantum error correction procedure, a quantum processing unit (QPU) calibration or testing procedure, or another type of quantum process.

In some implementations, the controllers 106A include memory or other components that store a quantum program containing quantum machine instructions for execution by the quantum computing system 103A. In some instances, the controllers 106A can interpret the quantum machine instructions and perform hardware-specific control operations according to the quantum machine instructions. For example, the controllers 106A may cause the signal hardware 104A to generate control signals that are delivered to the quantum processing unit 102A to execute the quantum machine instructions.

In some instances, the controllers 106A extract qubit state information from qubit readout signals, for example, to identify the quantum states of qubits in the quantum processing unit 102A or for other purposes. For example, the controllers may receive the qubit readout signals (e.g., in the form of analog waveforms) from the signal hardware 104A, digitize the qubit readout signals, and extract qubit state information from the digitized signals. In some cases, the controllers 106A compute measurement statistics based on qubit state information from multiple shots of a quantum program. For example, each shot may produce a bitstring representing qubit state measurements for a single execution of the quantum program, and a collection of bitstrings from multiple shots may be analyzed to compute quantum state probabilities.

In some implementations, the controllers 106A include one or more clocks that control the timing of operations. For example, operations performed by the controllers 106A may be scheduled for execution over a series of clock cycles, and clock signals from one or more clocks can be used to control the relative timing of each operation or groups of operations. In some implementations, the controllers 106A may include classical computer resources that perform some or all of the operations of the servers 108 described above. For example, the controllers 106A may operate a compiler to generate binary programs (e.g., full or partial binary programs) from source code; the controllers 106A may include an optimizer that performs classical computational tasks of a hybrid classical/quantum program; the controllers 106A may update binary programs (e.g., at runtime) to include new parameters based on an output of the optimizer, etc.

The other quantum computer system 103B and its components (e.g., the quantum processing unit 102B, the signal hardware 104B and controllers 106B) can be implemented as described above with respect to the quantum computer system 103A; in some cases, the quantum computer system 103B and its components may be implemented or may operate in another manner.

In some implementations, the quantum computer systems 103A, 103B are disparate systems that provide distinct modalities of quantum computation. For example, the computer system 101 may include both an adiabatic quantum computer system and a gate-based quantum computer system. As another example, the computer system 101 may include a superconducting circuit-based quantum computer system and an ion trap-based quantum computer system. In such cases, the computer system 101 may utilize each quantum computing system according to the type of quantum program that is being executed, according to availability or capacity, or based on other considerations.

FIG. 2 is a schematic diagram showing aspects of an example quantum computing system 200. The example quantum computing system 200 shown in FIG. 2 may be deployed as one or more of the quantum computing systems (e.g., 103A, 103B) shown in FIG. 1, or the quantum computing system 200 may be deployed in another type of computing environment. As shown in FIG. 2, the example quantum computing system 200 includes a control system 202 and a quantum processing unit 204. The example quantum computing system 200 may include additional or different features, and the components may be arranged in another manner.

The example quantum processing unit 204 includes a device array, which includes superconducting quantum circuit devices arranged in a two-dimensional or three-dimensional layout. Nine of the superconducting quantum circuit devices in the device array are shown in FIG. 2. In particular, FIG. 2 shows five tunable qubit devices 212A, 212B, 212C, 212D, 212E and four other devices 214A, 214B, 214C, 214D. The tunable qubit devices 212A, 212B, 212C, 212D, 212E may be implemented as tunable transmon qubit devices, flux qubit devices, flatsonium qubit devices, fluxonium qubit devices, or other types of tunable qubit devices. The other qubit devices 214A, 214B, 214C, 214D may be implemented as resonator devices, coupler devices, or other types of devices.

In the example shown in FIG. 2, the devices are arranged in a rectilinear (e.g., rectangular or square) array that extends in two spatial dimensions (in the plane of the page), and each tunable qubit device has four nearest-neighbor other devices. In some implementations, the devices can be arranged in another type of ordered array. In some instances, the rectilinear array also extends in a third spatial dimension (in/out of the page), for example, to form a cubic array or another type of three-dimensional array.

In some aspects, parametrically-activated quantum logic gates are supported in a two-dimensional or three-dimensional architecture (e.g. an architecture where circuit devices are distributed over two or three spatial dimensions). For instance, the positions of the tunable qubit devices within a quantum processing unit may define one or more two-dimensional spatial arrays in a plane, and readout resonators associated with the tunable qubit devices can be positioned within another plane (e.g., on another processor substrate). In some cases, tunable qubit devices on one substrate are electronically coupled to readout resonators on another substrate through conductive signal vias, interconnections, cap wafers, or other types of structures. Accordingly, frequency allocation schemes can be defined for two-dimensional and three-dimensional processor architectures.

In some implementations, the control system 202 interfaces with the quantum processing unit 204 through signal hardware that includes control lines 206. The control system 202 and control lines 206 may be implemented, for example, as described with respect to the example control system 105A shown in FIG. 1, or in another manner.

In the example quantum processing unit 204 shown in FIG. 2, each of the tunable qubit devices 212A, 212B, 212C, 212D, 212E can be encoded with a single bit of quantum information (a qubit). Each of the tunable qubit devices has two eigenstates that are used as computational basis states, and each tunable qubit device can transition between its computational basis states or exist in an arbitrary superposition of its computational basis states. In some examples, the two lowest energy levels (e.g., the ground state |0⟩ and the first excited state |1⟩) of each tunable qubit device are defined as a qubit and used as computational basis states for quantum computation. In some examples, higher energy levels (e.g., a second excited state |2⟩ or a third excited state |3⟩) are also defined by a tunable qubit device, and may be used for quantum computation in some instances.

In some implementations, the tunable qubit devices 212A, 212B, 212C, 212D, 212E are housed between neighboring pairs of the other devices 214A, 214B, 214C, 214D in the device array within the quantum processing unit 204. The qubits of the respective tunable qubit devices can be manipulated by control signals, or read by readout signals, generated by the control system 202. The tunable qubit devices can be controlled individually, for example, by delivering control signals to the respective tunable qubit devices. In some cases, a neighboring pair of devices (e.g., tunable qubit device 212C and other device 214A) is controlled jointly by delivering control signals to the tunable qubit device. In some cases, readout devices can detect the qubits of the tunable qubit devices, for example, by interacting directly with the respective tunable qubit devices.

Figure 6:
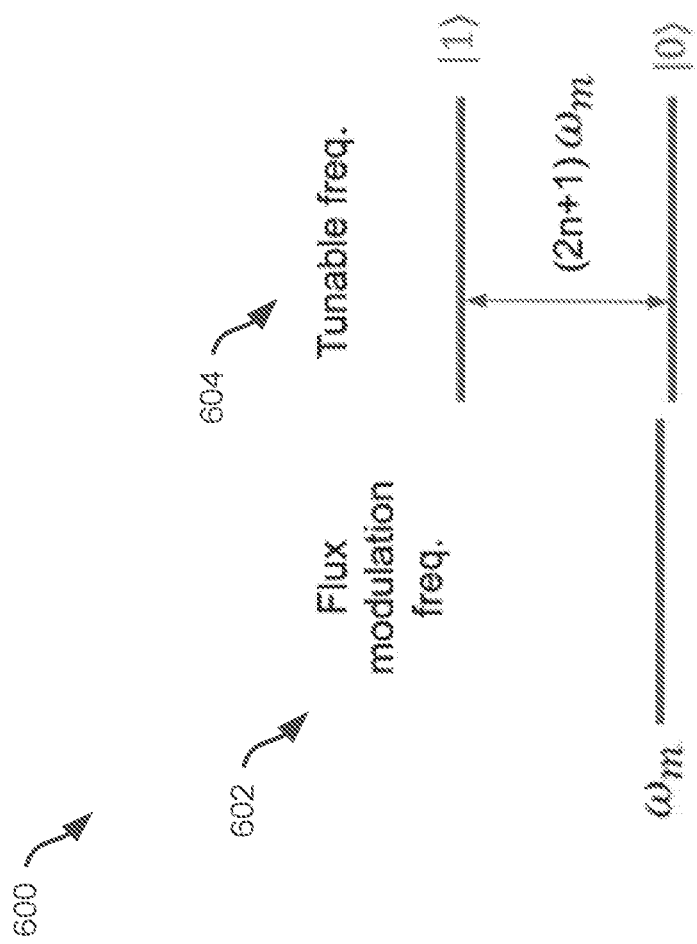
FIG. 6 is a schematic diagram showing energy levels defined by an example tunable qubit device of a quantum processing unit relative to a control signal under modulation.

In some examples, a tunable qubit device (e.g., a tunable transmon qubit device, a fluxonium qubit device, etc.) includes a superconducting circuit loop (e.g., a SQUID loop) that receives a magnetic flux that tunes the transition frequency of the tunable qubit device. In some instances, the transition frequency can be tuned within a range of qubit operating frequencies. The superconducting circuit loop may include two Josephson junctions, and the tunable qubit device may also include a shunt capacitor connected in parallel with each of the two Josephson junctions. In the example shown in FIG. 2, the energy difference E between any two adjacent energy levels in a qubit device can be represented as a transition frequency a of the qubit device (e.g., according to $\omega = E/\hbar$). Examples of energy levels and transition frequencies are shown in FIG. 6. In some examples, a transition frequency, which defines a qubit operating frequency of a tunable qubit device, is tunable, for example, by application of a magnetic flux. A qubit operating frequency of the tunable qubit device may be defined at least in part by Josephson energies of the two Josephson junctions, a capacitance of the shunt capacitor, and a magnetic flux threading the superconducting circuit loop.

Figure 7:
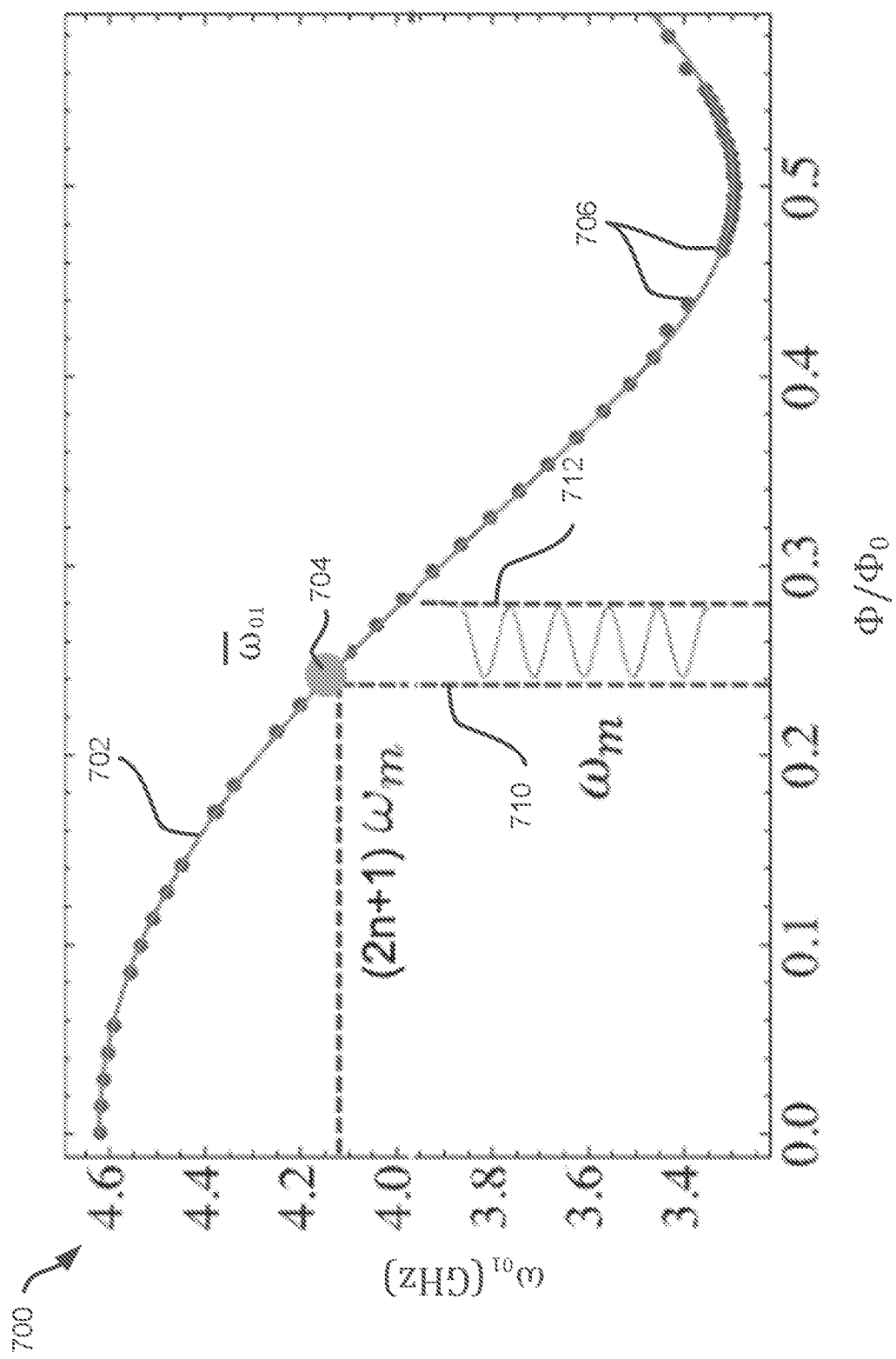
FIG. 7 is a plot showing transition frequency (GHz) as a function of magnetic flux (flux quanta) applied to an example tunable qubit device of a quantum processing unit.

As a particular example, FIGS. 3A-3B show equivalent circuits of an example tunable qubit device 302, which includes a superconducting circuit loop 304 (e.g., a SQUID loop) that receives a magnetic flux $\Phi(t)$ that controls the transition frequency of the tunable qubit device 302. Manipulating the magnetic flux $\Phi(t)$ through the superconducting circuit loop 304 can increase or decrease transition frequencies of the example tunable qubit device 302, e.g., tune the transition frequency of the tunable qubit device 302 to different values, e.g., as shown in FIG. 7. In some cases, an inductor or other types of flux bias elements is coupled to the superconducting circuit loop 304 by a mutual inductance, and the magnetic flux $\Phi(t)$ through the superconducting circuit loop 304 can be controlled by the current through a flux bias element associated with the superconducting circuit loop 304. In some cases, a coupling strength can be controlled by both AC and DC components of the current.

In the example shown in FIG. 2, each tunable qubit device 212A, 212B, 212C, 212D, 212E has one or more tunable transition frequencies. In particular, the transition frequencies of the tunable qubit devices 212A, 212B, 212C, 212D, 212E can be tuned by applying respective offset fields to the respective tunable qubit devices. Each of the offset field can be, for example, a magnetic flux bias, a DC electrical voltage, or another type of field. The tunable qubit devices can have a high "on/off" ratio, which refers to the ratio of the effective coupling rate provided by control of the tunable qubit device.

In some instances, information is encoded in the tunable qubit devices in the quantum processing unit 204, and the information can be processed by operation of the tunable qubit devices 212A, 212B, 212C, 212D, 212E. For instance, input information can be encoded in the computational states or computational subspaces defined by some or all of the tunable qubit devices in the quantum processing unit 204. The information can be processed, for example, by applying a quantum algorithm or other operations to the input information. The quantum algorithm may be decomposed as quantum logic gates or instruction sets that are performed by the tunable qubit devices over a series of clock cycles. For instance, a quantum algorithm may be executed by performing a sequence of quantum logic gates. In some cases, information is processed in another manner. Processing the information encoded in the tunable qubit devices can produce output information that can be extracted from the tunable qubit devices. The output information can be extracted, for example, by performing state tomography or individual readout operations. In some instances, the output information is extracted over multiple clock cycles or in parallel with the processing operations.

As shown in FIG. 2, the control system 202 is coupled to the tunable qubit devices 212C in the quantum processing unit 204 through one or more control lines 206 to send control signals and receive readout signals. The control signals can be configured to modulate, increase, decrease, or otherwise manipulate the qubit operating frequencies of the tunable qubit devices 212A, 212B, 212C, 212D, 212E. For example, the control signal for a respective tunable qubit device may include a flux modulation signal that varies a magnetic flux experienced by the respective tunable qubit device, and varying the magnetic flux can change the transition frequency thus the qubit operating frequency of the tunable qubit device. In some implementations, a control signal can be a direct current (DC) signal communicated from the control system 202 to a respective tunable qubit device. In some implementations, a control signal can be an alternating current (AC) signal (which may be superposed with a direct current (DC) signal) communicated from the control system 202 to a respective tunable qubit device. Other types of control signals may be used.

In some implementations, a transition frequency ($f_T$) of a tunable qubit device can be tuned by tuning a magnetic flux threading a superconducting circuit loop in the tunable qubit device. A magnetic flux can be tuned by communicating a flux modulation signal from a control system to a flux bias element in a flux bias control line. Consequently, the transition frequency $f_T$ of the tunable qubit device can be tuned. In some instances, a flux modulation signal includes a modulation frequency ($f_m$) causing the transition frequency $f_T$ of the tunable qubit device to oscillate at a harmonic of the modulation frequency $f_m$. In some instances, the transition frequency $f_T$ under modulation is in a range of qubit operation frequencies which is defined by a tunability of the tunable qubit device. The range of qubit operating frequencies has a minimum frequency which can be greater than 1 GigaHertz (GHz), greater than 3 GHz, or in another range. In some implementations, a parametrically activated single-qubit quantum logic gate can be performed by communicating a drive signal with a drive frequency through a qubit drive control line to the tunable qubit device. The drive signal can drive the transition between two energy states (e.g., between the ground state and the first excited state) causing a population exchange between the ground state and the excited state.

In some examples, the modulation frequency of the flux modulation signal and the drive frequency of the drive signal are below the range of qubit operating frequencies. In other words, the modulation frequency and the drive frequency are less than the minimum frequency (e.g., 1 GHz, 3 GHz, or another value). For example, the modulation frequency (or modulation frequencies) can be less than a designated percentage (e.g., 90%, 50%, 10%, etc.) of the minimum frequency of the qubit device (or less than a designated percentage of an average qubit operating frequency, or another reference frequency). In some instances, the qubit drive control signal is detuned from the qubit operating frequency of the tunable qubit device. For example, a difference between a drive frequency and an average qubit operating frequency of a tunable qubit device under modulation can be greater than either the linewidth of the qubit or spectral bandwidth of the pulse. In some implementations, a drive frequency of the drive signal may be a subharmonic of an average qubit operating frequency of a tunable qubit device under modulation. In some instances, a subharmonic is a frequency that is an integral submultiple of a fundamental frequency, e.g., the average qubit operating frequency. A parametric subharmonic quantum logic gate can be activated by communicating a subharmonic drive signal to interact with the qubit defined by the tunable qubit device. In some implementations, a parametric subharmonic quantum logic gate may operate in a deep subharmonic regime, e.g., the drive frequency $\omega_d$ is much smaller than the average qubit operating frequency under modulation $\omega_{01}$, e.g., $\omega_d = \overline{\omega}_{01}/(2n-1)$, where n is a positive integer. In some examples, a relatively large value of n, for instance n=13 or greater, is used.

In some implementations, control signals for a tunable qubit device (e.g., the tunable qubit device 212C) including a flux modulation signal and a drive signal can be communicated to the tunable qubit device on two separate control lines, e.g., a flux bias control line (e.g., the example flux bias control line 308A in FIG. 3A) and a qubit drive control line (e.g., the example qubit drive control line 308B in FIG. 3B). In some instances, the flux bias control line can be inductively coupled to the superconducting circuit loop to control the magnetic flux and thereby control the transition frequencies of the tunable qubit device. In certain examples, the qubit drive control line can be capacitively coupled to the tunable qubit device, e.g., through one or more qubit electrodes of the tunable qubit device. In this case, when a drive signal with a drive frequency and a flux modulation signal with a modulation frequency that is a subharmonic of an average transition frequency of the tunable qubit device under modulation shifted by the drive frequency are communicated to the tunable qubit device through the respective control lines, a single-qubit rotation can be activated. In certain instances, crosstalk may exist between two separate control lines 206. For example, when crosstalk exists between a flux bias control line and a qubit drive line, a flux bias control line may be also used to drive the tunable qubit device, e.g., in a "self-driving" mode of operation.

In some implementations, one control signal can serve as both the flux modulation signal and the drive signal, which can be communicated from a control system to a tunable qubit device on a single control line, e.g., the combined flux bias and qubit control line 338A in FIG. 3B, which are configured to inductively and capacitively couple with the tunable qubit device. In this case, when the control signal is modulated and the modulated control signal with a modulation frequency that is a subharmonic of an average qubit operating frequency of the tunable qubit device under modulation is communicated to the tunable qubit device, the modulated control signal can be used as a subharmonic drive signal (e.g., "self-driving") to activate a single-qubit rotation or another type of single-qubit quantum logic gate. In some instances, when the modulation frequency is at an odd subharmonic frequency of the average transition frequency under modulation, the modulated control signal can enable coherent subharmonic resonance and activate the single-qubit quantum logic gate. In such examples, a parametrically activated single-qubit quantum logic gate can be performed by sending a radio-frequency (RF) or microwave tone to the single control line. The frequency and duration of the RF or microwave tone can be selected to achieve a specified quantum logic gate based on the transition frequency.

In some cases, the control signal(s) used to perform a single-qubit gate contain one or more frequency components, and all the frequency components of the control signal(s) may correspond to frequencies below the transition frequency of the tunable qubit device. For example, each control signal may contain only frequencies that are well below (e.g., less than half) the minimum transition frequency of the tunable qubit device. In such cases, the control signal does not contain any frequency components at or above the transition frequency of the tunable qubit device. Each control signal may contain a single low-frequency component (e.g., a sinusoid), a sum of well-defined low-frequency components (e.g., a sum of sinusoids), or an arbitrary collection of low frequencies. In some cases, a control signal is generated or improved using optimal control theory (OCT), such as, for example, gradient ascent pulse engineering (GRAPE) or other numerical techniques. Such numerical techniques can be programmed to produce control signals having frequency components that are below a threshold frequency, for example, below a minimum frequency of a tunable qubit device, below a maximum frequency that can be produced by a particular hardware component, etc. Using only low-frequency signals can provide a number of technical advantages, for example, reduced noise, lower power consumption, and higher gate fidelities, among others.

The combined flux bias and qubit control line can be used to excite the qubit (e.g., with a X, pulse), as well as modulate the frequency to operate a two-qubit gate in a standard parametric gate architecture. To perform both actions, these operations may be performed serially in time, e.g., a pulse train, on the same combined flux bias and qubit control line.

In some implementations, the control lines 206 or the control system 202 (or both) include circuit components, structures, or other elements that account for subharmonic driving. For example, the control lines 206 may include filters, e.g., low-pass filter, band-pass filters, or other types of filters, with a pass band in the subharmonic driving regime (e.g., RF or microwave frequency regime) and a stop band for low-order resonances, e.g., first-order harmonics. For example, the control line 206 may include a low-pass filter with a cutoff frequency of 1 GHz, 3 GHz, or another value. In certain instances, the control lines may be connected to on-chip or near-chip filters (e.g. Purcell filters or other filters) with low dissipation elements (e.g. superconductors) which can suppress the spontaneous emission of superconducting qubit devices but act as a pass-band filter for subharmonic driving signals.

In some examples, the control line 206 includes transmission structures for low-frequency operations (e.g., less than 1 GHz, 3 GHz, or in a different range). For example, the control lines 206 may include twisted pair wiring or another type of signal line with improved electromagnetic compatibility. In some instances, the control lines 206 may include circuit elements for direct digital synthesis or analog waveform synthesis at low-frequency for generating quantum logic gates or readout control signals (e.g., DAC outputs and on-PCB filtering).

In some instances, the control system 202 identifies a single-qubit quantum logic gate to be applied to a tunable qubit device in the quantum processing unit 204. In examples described below, two of the transition frequencies of the tunable qubit device 212C can be expressed $\omega_{01}(t)$ and $\omega_{01}(t) - \eta(t)$, where $\eta(t)$ is the anharmonicities of the tunable qubit device. The control signal can be configured to apply the single-qubit quantum logic gate by modulating the transition frequency $\omega_{01}(t)$ of the tunable qubit device 212C, for example, at a specified modulation frequency $\omega_m$.

In some cases, the modulation frequency $\omega_m$ is determined based on a reference transition frequency of the tunable qubit device 212C. The reference transition frequency can be, for example, the average qubit operating frequency of the tunable qubit device during the modulation. In some cases, the modulation frequency $\omega_m$, the modulation amplitude da, or other parameters of the control signal for a quantum logic gate are determined based on transition frequencies, anharmonicities, data from a calibration or other test procedure, or a combination of these and other information. In some cases, the control signal can be a simple sinusoid having the single frequency $\omega_m$ with a modulation amplitude $\delta\omega$ around an average qubit operating frequency $\overline{\omega}_{01}$.

The modulation frequency $\omega_m$ and other parameters of the control signal can be selected to achieve a specified quantum logic gate in some cases. In some systems, the modulation frequency $\omega_m$ is in a radio frequency or microwave frequency regime, for example, in a range of 1 MHz to 1 GHz or a different range. For instance, in some superconducting systems, a modulation frequency $\omega_m$ at or below 2 GHz may be used for single-qubit quantum logic gates. Other frequency ranges may be used in superconducting systems or other types of systems. The duration of the interaction produced by the modulation frequency $\omega_m$ may also be selected to achieve a specified quantum logic gate in some cases. In some systems, the interaction time is in the range of 1 nanoseconds to 10 microseconds. For instance, in some superconducting systems, the total interaction time for certain single-gates is in the range of 10 nanoseconds to 1 microsecond. Other interaction times may be used in superconducting systems or other types of systems.

The total interaction time may be determined by the control system 202 based on the parameters of the quantum logic gate to be applied, based on the modulation frequency $\omega_m$, the modulation amplitude da, or other parameters. In some cases, the total interaction time is selected based on a preselected value, data from a calibration, other test procedure, or a combination of these and other information.

In some cases, the control line 206 (which transmits the control signals) may include a flux bias device or another type of flux bias element that is inductively coupled to the superconducting circuit loop of the tunable qubit device 212C to control the magnetic flux through a superconducting circuit loop in the tunable qubit device 212C. The control signal may cause the flux-bias device to modulate the magnetic flux at a modulation frequency; the modulation frequency may be the same as the modulation frequency $\omega_m$, or the flux modulation frequency may be a different value (e.g., half the modulation frequency $\omega_m$).

In some implementations, the control system 202, or another type of system associated with the quantum computing system 200, determines gate parameters for applying parametrically activated quantum logic gates in the quantum processing unit 204. For example, the gate parameters may be determined by a gate calibration process defined in software, firmware or hardware, or a combination thereof with respect to the operation 1102 in the example process 1100.

In some cases, the control system 202 executes a gate calibration process when the quantum processing unit 204 is first installed for use in the quantum computing system 200, and the gate calibration process may be repeated at other times (e.g., as needed, periodically, according to a calibration schedule, etc.). For instance, a gate calibration module may execute a calibration process that obtains qubit device parameters of the qubit devices in the quantum processing unit 204. The qubit device parameters may be obtained by the gate calibration process, for example, based on measurements of the quantum processing unit 204, based on a circuit specification of the quantum processing unit 204, based on analytical or numerical calculations, or otherwise. The qubit device parameters may include, for example, qubit frequencies (e.g., a tunable range) and an anharmonicity for each tunable qubit device. Based on the qubit device parameters, the calibration process may select gate parameters of a single-qubit quantum logic gate for application to the qubit defined by the tunable qubit device 212C. This may be executed for each of the tunable qubit devices in the quantum processing unit 204.

In some implementations, a calibration process executed by the control system 202 or another type of system selects parameters of the control signals for delivery to the control line coupled to the tunable qubit device 212C. The gate parameters may correspond to a modulation amplitude of a flux modulation produced by the control signal; a modulation frequency of the flux modulation produced by the control signal; a modulation time (a duration) of the flux modulation produced by the control signal; and possibly other parameters. The modulation frequency can be determined based on a drive frequency; based on an average qubit operating frequency; based on the transition frequency between the ground state and first excited state of the tunable qubit device; based on the transition frequency between the first excited state and second excited state of the tunable qubit device; or based on any combination of these and other qubit device parameters.

FIG. 3A is a schematic diagram showing an equivalent circuit 300 of an example superconducting quantum processing unit 300. The example superconducting quantum processing unit 300 includes a tunable qubit device 302. The superconducting quantum processing unit 300 may be implemented as the quantum processing unit 204 in FIG. 2, or the equivalent circuit in FIG. 3A can represent devices in another type of system or environment. The superconducting quantum processing unit 300 may include additional or different features, and the components may be arranged as shown or in another manner.

In the examples shown in FIG. 3A, the tunable qubit device 302 is a transmon qubit device with a transition frequency that is tunable, for example, by applying an offset field. The transition frequency is also known as "resonant frequency" or "fundamental frequency", which is defined by the energy difference between the first and second excited states of the qubit divided by Planck's constant (e.g., according to $\omega = E/\hbar$). The transition frequency also defines the qubit operating frequency of the tunable qubit device 302.

The tunable qubit device 302 may be implemented as a flux qubit device, a flatsonium qubit device, a fluxonium qubit device, or another type of tunable qubit device. As shown in FIG. 3A, the tunable qubit device 302 includes a superconducting circuit loop 318, which can receive a magnetic flux that tunes the transition frequency of the tunable qubit device 302. As shown, the tunable qubit device 302 includes two Josephson junctions 312, 314. The two Josephson junctions 312, 314 having Josephson energies $E_{J1}$ and $E_{J2}$ are connected in parallel with each other forming the superconducting circuit loop 318. In some instances, the tunable qubit device is asymmetric, e.g., the two Josephson junctions 312, 314 have different Josephson junction energies. The tunable qubit device 302 includes a shunt capacitor 316 with a capacitance $C_{Jt}$, which is connected in parallel with the two Josephson junctions 312, 314. In some implementations, the Josephson junctions 312, 314 in the superconducting circuit loop 318 are asymmetric (e.g., $E_{J1} < E_{J2}$). The asymmetry can result in tunability of the tunable qubit device 302. In some examples, the superconducting circuit loop 318 of the tunable qubit device 302 may include one Josephson junction and a linear inductor, three Josephson junctions, or in another manner.

In some implementations, the transition frequency of the tunable qubit device 302 may be defined at least in part by Josephson energies $E_{J1}$, $E_{J2}$ of the two Josephson junctions 312, 314, a capacitance $C_{Jt}$ of the shunt capacitor 316, and a magnetic flux $\Phi(t)$ threading the superconducting circuit loop 318. As shown in FIG. 3A, the tunable qubit device 302 is coupled with a flux bias control line 308A. In some implementations, the flux bias control line 308A can be a conductor, an inductor (e.g., a partial loop, a single loop, or multiple loops of a conductor), or another type of circuit component that has a mutual inductance with the superconducting circuit loop 318. The flux bias control line 308A can include, for example, a flux bias element that is configured to receive a flux modulation signal and convert the received flux modulation signal to the magnetic field to the tunable qubit device 302. For instance, the flux bias element may include an inductor which is configured to carry a current I and has a mutual inductance with the superconducting circuit loop 318. In some implementations, the flux bias element on the flux bias control line 308B is coupled (e.g., conductively, capacitively, or inductively) to a control port to receive the flux modulation signal from a control system (e.g., the control system 202 in FIG. 2). In some implementations, the flux modulation signals on the flux bias control line are implemented as the control signals on the control lines 206 as shown in FIG. 2.

In certain instances, the flux modulation signals on the flux bias control line 308A may cause the flux bias element to generate and modulate the magnetic flux $\Phi(t)$ in the superconducting circuit loop 318. Manipulating the magnetic flux $\Phi(t)$ through the superconducting circuit loop 318, can increase or decrease the transition frequencies of the example tunable qubit device 302. In some instances, the transition frequency may be tuned in another manner, for instance, by another type of control signal.

In general, a tunable qubit device can be characterized by qubit device parameters. In some instances, qubit device parameters that can be used to characterize a tunable qubit device include a range of qubit operating frequencies. In certain examples, a range of qubit operating frequencies is defined by a maximal frequency value, e.g., the $|0\rangle \rightarrow |1\rangle$ transition frequency value at a magnetic flux of zero flux quantum applied to the tunable qubit device, $$\omega_{01}(\Phi=0) \equiv \omega_{01}^{max} \tag{1}$$

and a minimum frequency value, e.g., the $|0\rangle \rightarrow |1\rangle$ transition frequency value at a magnetic flux of half-flux quantum, $$\omega_{01}\left(\Phi = \frac{\Phi_0}{2}\right) \equiv \omega_{01}^{min} \tag{2}$$

anharmonicity at the magnetic flux of zero flux quantum, $$\eta(\Phi=0) \equiv \eta^{max} \tag{3}$$

and the applied flux $\Phi$, e.g., $$Q = Q(\omega_{01}^{max}, \omega_{01}^{min}, \eta^{max}, \Phi) \tag{4}$$

In some systems, modulating the magnetic flux can affect the transition frequency of the tunable qubit device. For example, each of the example tunable qubit devices 302, 332 represented in FIGS. 3A-3B is made of two Josephson junctions, and the transition frequency between the two energy levels $|0\rangle$ $|1\rangle$ and anharmonicity are given by:

$$\omega_{01}(\Phi(t)) \approx E_C\left[f(\Phi) - \left(1 + \frac{1}{f(\Phi)} + \frac{21}{8f^2(\Phi)} + \frac{19}{2f^3(\Phi)}\right)\right], \tag{5}$$

$$\eta(\Phi(t)) \approx E_C\left(1 + \frac{9}{4f(\Phi)} + \frac{81}{8f^2(\Phi)} + \frac{3645}{2^6 f^3(\Phi)}\right),$$

where $$f(\Phi) = \sqrt{\frac{8E_J}{E_C}\frac{1}{1+r}\sqrt{1+r^2 + 2r\cos(2\pi(\Phi + \delta\Phi)/\Phi_0)}}, \tag{6}$$

$$r = \frac{E_{J2}}{E_{J1}}, \text{ and}$$

$$E_J = E_{J1} + E_{J2}.$$

with $E_{J1}$ and $E_{J2}$ being the Josephson junction energies of the two Josephson junctions in the superconducting circuit loop 318, 348.

As shown in FIG. 3A, the superconducting quantum processing unit includes a qubit drive line 308B, which receives a drive signal, for example, from the control system. The qubit drive line 308B is capacitively coupled to the tunable qubit device 302 via a capacitor 322C having a capacitance Cc. The drive signal received by the qubit drive line 308B has a frequency in a microwave frequency regime less than the range of the qubit operating frequency of the tunable qubit device 302. The drive signal can be used to control the tunable qubit device 302, e.g., from one quantum state to a different quantum state.

As shown in FIG. 3A, the flux bias control line 308A and the qubit drive line 308B are separately routed on the same substrate or die as the superconducting quantum processing unit. In some instances, the flux bias control line 308A, the qubit drive line 308B may be routed on a cap wafer which is bonded with a device wafer on which the superconducting quantum processing unit resides.

As shown in FIG. 3A, the superconducting quantum processing unit includes a readout resonator device 304 configured to perform a readout operation of the qubit of the tunable qubit device 302. In the example shown in FIG. 3A, the readout resonator device 304 and the tunable qubit device 302 are coupled by a capacitor 322A. In some instances, the readout resonator device 304 and the tunable qubit device 302 may be coupled in another manner, for example by a tunable coupler device. The tunable qubit device 302 can be isolated from the readout resonator device 304 during a single-qubit quantum logic gate operation. The readout resonator device 304 is capacitively coupled to a readout control line 308C with a voltage source 306 by a capacitor 322B. The readout control line 308C can probe the frequency shift of the readout resonator device, control the rate when extracting information from the readout resonator device 304, or provide another functionality.

In some implementations, the flux modulation signal can be applied to the flux bias element to obtain a modulated magnetic flux applied to the superconducting circuit loop 318. The modulated magnetic flux applied to the superconducting circuit loop 318 can cause a modulation to the transition frequency of the tunable qubit device 302. In another instance, operation of the tunable qubit device 302 and the control lines 308A, 308B, 308C can be implemented with respect to the example process 1100 shown in FIG. 11 or in another manner.

The flux modulation signal is characterized by a DC bias $\Phi_{dc}$, a modulation amplitude $\Phi_{ac}$, a modulation frequency $f_m$, and a modulation phase $\theta_m$. The drive signal can be characterized by a drive amplitude $\Omega_d$, a drive frequency $f_d$, and a drive phase $\theta_d$. $\omega \equiv 2\pi f$. Two energy levels are considered in the tunable qubit device 302. The Hamitonian can be expressed as:

$$H(t) = \omega_{01}(t)|1\rangle\langle 1| + \Omega_d \cos(\omega_d t + \theta_d)(|1\rangle\langle 0| + |0\rangle\langle 1|). \quad (7)$$

where $\omega_{01}(t)$ is the transition frequency of the tunable qubit device 302 under modulation, which can be expanded in harmonics of the modulation frequency $f_m$. The physics in the interaction picture can then be simplified by Fourier expanding $e^{i\int \omega(t)}$, $$e^{i\int_0^t dt' \omega_{01}(t')} = e^{i\bar{\omega}_{01} t} \sum_{n \in \mathbb{Z}} \varepsilon_n e^{i(n\omega_m t + \theta_n)}. \quad (8)$$

where $\varepsilon_n$ is a respective side band weight of an n-th harmonic, and $\theta_n$ is a phase of the n-th harmonic.

The Hamiltonian in the interaction picture can be expressed as:

$$\tilde{H}(t) = \sum_{n \in \mathbb{Z}} \frac{\Omega_d \varepsilon_n}{2} \left[ e^{i(\bar{\omega}_{01} + n\omega_m + \omega_d)t} e^{i(\theta_n + \theta_d)} + e^{i(\bar{\omega}_{01} + n\omega_m + \omega_d)t} e^{i(\theta_n + \theta_d)} \right] |1\rangle \quad (9)$$

$$\langle 0| + H.c.$$

In some implementations, a single qubit rotation is realized when the drive frequency $\omega_d$ is equal to the average qubit operating frequency under modulation $\bar{\omega}_{01}$, e.g., $f_d = \bar{f}_{01}$. In some instances, a single qubit rotation can be also realized when the drive frequency $f_d$ is less than the average qubit operating frequency $\bar{\omega}_{01}$, or when the modulation frequency $f_m$ of the flux modulation signal applied on the flux bias element puts a sideband frequency in resonance with the drive frequency $f_d$. In some implementations, this modulation frequency in the flux modulation signal causes the same modulation frequency to the magnetic flux in the circuit loop or to the transition frequency of the tunable qubit device.

$$\bar{f}_{01} + nf_m \pm f_d = 0, \quad (10)$$

$$f_m = \left| \frac{\bar{f}_{01} \pm f_d}{n} \right|.$$

As shown in Equation (9), a single qubit drive with a strength of $\omega_d \varepsilon_n/2$ and a phase of $\theta_n + \theta_d$ can be obtained. In some instances, a single qubit rotation can be achieved using another operation or in another manner. It is assumed that the tunable qubit device 302 is parked at a DC flux sweet spot, e.g., the average qubit operating frequency $\bar{f}_{01}$ of the tunable qubit device 302 is tuned to and maintained at a frequency value such that $\partial \bar{f}_{01}/\partial \Phi_{dc} = 0$. As a consequence the weight of the odd sidebands vanish, e.g., $\varepsilon_{2n+1} = 0$, where n is an integer.

FIG. 3B is a schematic diagram showing an equivalent circuit of another example superconducting quantum processing unit 330. The example superconducting quantum processing unit includes a tunable qubit device 332. The superconducting quantum processing unit 330 may be implemented as the quantum processing unit 204 in FIG. 2, or the equivalent circuit in FIG. 3A can represent devices in another type of system or environment. The superconducting quantum processing unit 330 may include additional or different features, and the components may be arranged as shown or in another manner.

In the examples shown in FIG. 3B, the tunable qubit device 332 is a transmon qubit device with a transition frequency that is tunable, for example, by applying an offset field. As shown, the tunable qubit device 332 includes two Josephson junctions 342, 344. The two Josephson junctions 342, 344 having Josephson energies $E_{J1}$ and $E_{J2}$ are connected in parallel with each other forming a superconducting circuit loop 348. The tunable qubit device 332 includes a shunt capacitor 346 with a capacitance $C_{Jt}$, which is connected in parallel with the two Josephson junctions 342, 344. In some implementations, the tunable qubit device 332 may be implemented as the tunable qubit device 302 in the superconducting quantum processing unit 300 of FIG. 3A or in another manner.

As shown in FIG. 3B, the tunable qubit device 332 is coupled with a combined flux bias and qubit control line 338A. In some implementations, the combined flux bias and qubit control line 338A is configured to inductively and capacitively couple with the tunable qubit device 332. In some instances, the combined flux bias and qubit control line 338A may be used for tuning the transition frequency of the tunable qubit device 332 by changing the magnetic flux in the superconducting circuit loop 348 and drive the tunable qubit device 332 from one quantum state to another quantum state.

In some implementations, the combined flux bias and qubit control line 338A are routed on the same substrate or device die as the superconducting quantum processing unit 330. In some instances, the combined flux bias and qubit control line 338A may be routed on a cap wafer which is bonded with a device wafer on which the superconducting quantum processing unit 330 resides.

As shown in FIG. 3B, the superconducting quantum processing unit includes a readout resonator device 334 for performing a readout operation of the qubit of the tunable qubit device 332. In the example shown in FIG. 3B, the readout resonator device 334 and the tunable qubit device 332 are coupled by a capacitor 352A. In some instances, the readout resonator device 334 and the tunable qubit device 332 may be coupled in another manner, for example by a tunable coupler device. The tunable qubit device 332 can be isolated from the readout resonator device 334 during a single-qubit quantum logic gate operation. The readout resonator device 334 is capacitively coupled to a readout control line 338B with a voltage source 336 by a capacitor 352B. The readout control line 338B can probe the frequency shift of the readout resonator device 334, control the rate when extracting information from the readout resonator device 334, or provide another functionality. In some instances, the readout control line 338B and the readout resonator device 334 may be implemented as the readout control line 308B and the readout resonator device 304 in FIG. 3A or in another manner.

In some implementations, the control signal on the combined flux bias and qubit control line 338A can be modulated. The control signal under modulation can be applied to the flux bias element to create a modulated magnetic flux to the superconducting circuit loop 348. The modulated magnetic flux applied to the superconducting circuit loop 348 can cause a modulation to the qubit operating frequency of the tunable qubit device 332. In another instance, operation of the tunable qubit device 332 and the control lines 338A, 338B can be implemented with respect to the example process 1100 shown in FIG. 11 or in another manner.

The control signal under modulation on the combined flux bias and qubit control line 338A is used to directly drive the tunable qubit device 332. In some instances, the combined flux bias and qubit control line 338A includes a flux bias line and a qubit control line which are capacitively coupled and have crosstalk between each other. In some instances, the capacitively coupled flux bias line and the qubit control line in the combined flux bias and qubit control line 338A may receive control signals from a single signal feedline. In other words, frequency modulation and excitation drives are delivered to the flux bias line and the qubit control line over a single input. In certain instances, the capacitively coupled flux bias line and the qubit control line in the combined flux bias and qubit control line 338A may receive control signals from different signal feedlines, or in another manner. The control signal under modulation can activate single qubit rotations. In this case, the drive frequency equals to the modulation frequency, e.g., $f_d=f_m$, the drive strength equals to modulation amplitude, $\omega_d=\omega_m$, drive phase equals to the modulation phase $\theta_d=\theta_m$ the corresponding drive strength and phase. The Hamiltonian in the interaction picture can be expressed as $$\tilde{H}(t) = \sum_{n \in \mathbb{Z}} \frac{\Omega_m \lambda_n e^{i\phi_n}}{2} e^{i(\varpi_{01}+n\omega_m)t} |1\rangle\langle 0| + H.c. \tag{11}$$

where $$\lambda_n e^{i\phi_n} = \varepsilon_{n-1} e^{i(\theta_{n-1}+\theta_m)} + \varepsilon_{n+1} e^{i(\theta_{n+1}-\theta_m)}. \tag{12}$$

where $\lambda_n$ is renormalization of the drive strength due to the flux modulation, and $\phi_n$ is the corresponding phase.

At a DC sweet spot, the resonance condition is, $$f_m = \frac{f_{01}}{|2n+1|}. \tag{13}$$

Figure 4:
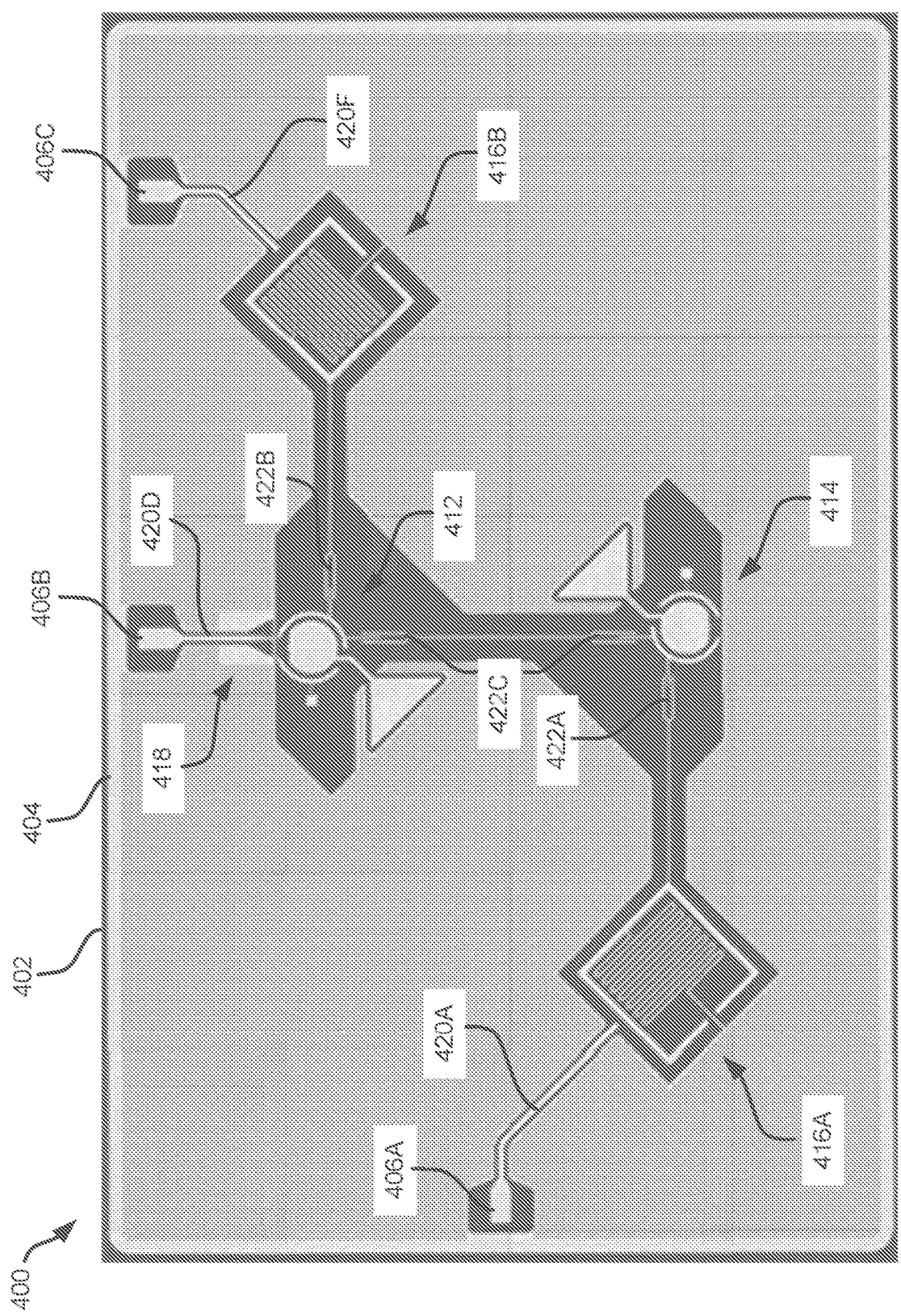
FIG. 4 is a schematic diagram of a top view of an example quantum processing unit.

FIG. 4 is a schematic diagram showing aspects of an example superconducting quantum processing unit 400. The example superconducting quantum processing unit 400 can be represented by the equivalent circuit shown in FIG. 3B. Other superconducting circuits or other types of systems may be represented by the equivalent circuit 300 shown in FIG. 3A. The example superconducting circuit 400 shown in FIG. 4 includes a substrate 402 (e.g., sapphire or silicon or another dielectric material), with circuit devices and a ground plane 404 disposed on the substrate 402. The circuit devices and the ground plane 404 can be formed by one or more metal (e.g. superconducting metal) layers or other materials on the surface of the substrate 402.

In the example shown in FIG. 4, the circuit devices include a tunable qubit device 412, a flux-bias element 418, and a readout resonator 416. The tunable qubit device 412 includes a superconducting circuit loop that has two Josephson junctions in parallel, and the superconducting circuit loop is inductively coupled to (has a mutual inductance with) the flux-bias element 418. The example superconducting quantum processing unit 400 also includes three signal ports: a signal port 406A that is connected to the readout resonator 416A by a first signal line 420A; a signal port 406B that is connected to the flux-bias element 418 by a second signal line 420B; and a signal port 406C that is coupled to the tunable qubit device 412 by a third signal line 420E. The signal ports can communicate control signals between an external control system and the devices in the superconducting quantum processing unit 400. The example superconducting quantum processing unit 400 also includes capacitive couplings between the circuit devices: the readout resonator 416A is capacitively coupled to the tunable qubit device 412 through the signal line 420B. The superconducting circuit 400 may include additional or different features and components, which may be configured in another manner.

The example quantum processing unit 400 shown in FIG. 4 resides on the top surface of a substrate 402. In certain instances, the substrate 402 may be an elemental semiconductor, for example silicon (Si), germanium (Ge), selenium (Se), tellurium (Te), or another elemental semiconductor. In some instances, the substrate 402 may also include a compound semiconductor such as aluminum oxide (sapphire), silicon carbide (SiC), gallium arsenic (GaAs), indium arsenide (InAs), indium phosphide (InP), silicon germanium (SiGe), silicon germanium carbide (SiGeC), gallium arsenic phosphide (GaAsP), gallium indium phosphide (GaInP), or another compound semiconductor. In some instances, the substrate 402 may also include a superlattice with elemental or compound semiconductor layers. In certain instances, the substrate 402 includes an epitaxial layer. In some examples, the substrate 402 may have an epitaxial layer overlying a bulk semiconductor or may include a semiconductor-on-insulator (SOI) structure.

The qubit electrodes and the ground plane include superconductive materials and can be formed by patterning one or more superconductive (e.g. superconducting metal) layers or other materials on the surface of the substrate 402. In some implementations, each of the one or more superconductive layers include a superconducting metal, such as aluminum (Al), niobium (Nb), tantalum (Ta), titanium (Ti), vanadium (V), tungsten (W), zirconium (Zr), or another superconducting metal. In some implementations, each of the one or more superconductive layers may include a superconducting metal alloy, such as molybdenum-rhenium (Mo/Re), niobium-tin (Nb/Sn), or another superconducting metal alloy. In some implementations, each of the superconductive layers may include a superconducting compound material, including superconducting metal nitrides and superconducting metal oxides, such as titanium-nitride (TiN), niobium-nitride (NbN), zirconium-nitride (ZrN), hafnium-nitride (HfN), vanadium-nitride (VN), tantalum-nitride (TaN), molybdenum-nitride (MoN), yttrium barium copper oxide (Y—Ba—Cu—O), or another superconducting compound material. In some instances, the qubit electrodes and the ground plane may include multilayer superconductor-insulator heterostructures.

In some implementations, the qubit electrodes and the ground plane are fabricated on the top surface of the substrate 402 and patterned using a microfabrication process or in another manner. For example, the qubit electrodes and the ground plane may be formed by performing at least some of the following fabrication steps: using chemical vapor deposition (CVD), physical vapor deposition (PVD), atomic layer deposition (ALD), spin-on coating, and/or other suitable techniques to deposit respective superconducting layers on the substrate 402; and performing one or more patterning processes (e.g., a lithography process, a dry/wet etching process, a soft/hard baking process, a cleaning process, etc.) to form openings in the respective superconducting layers.

Figure 5:
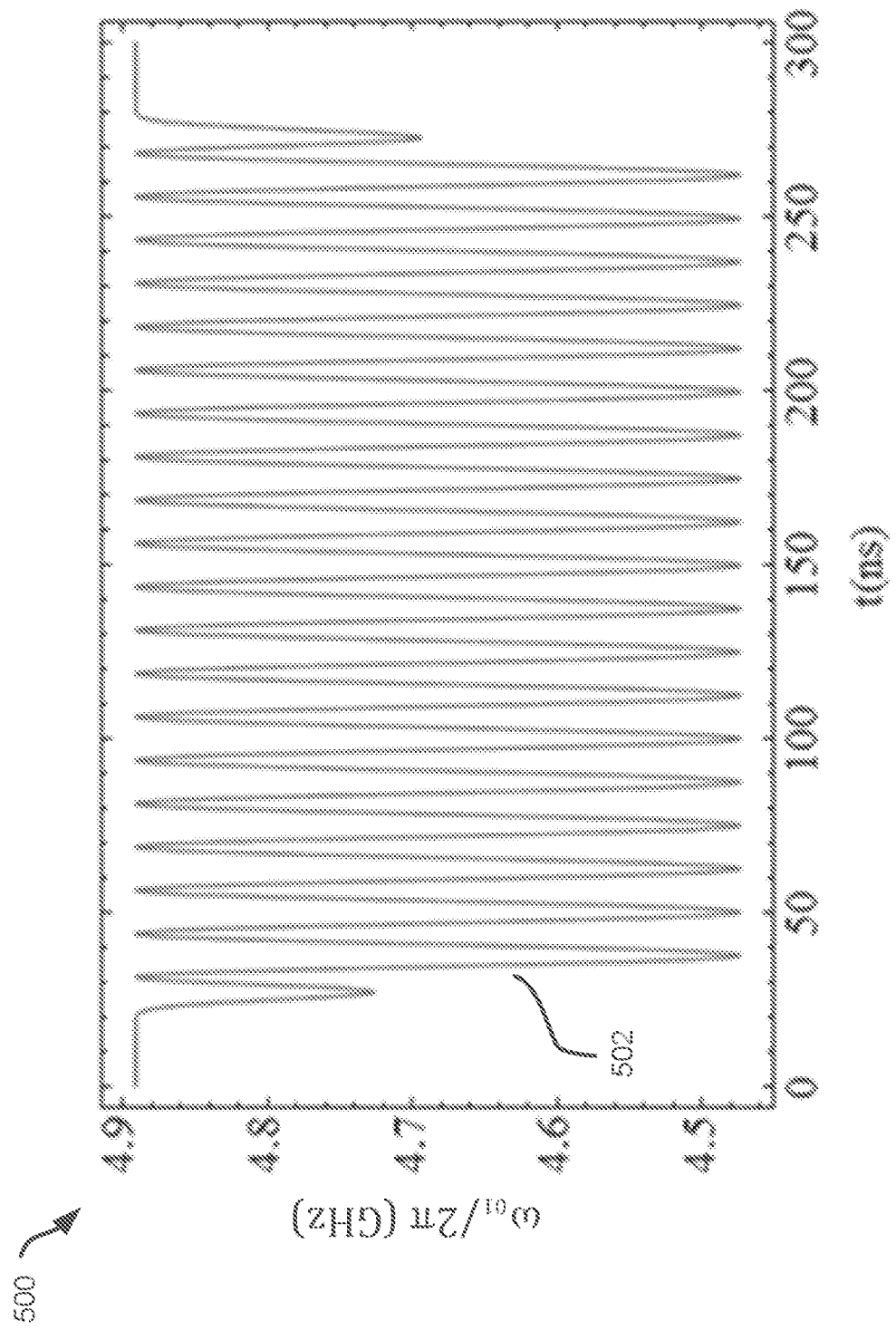
FIG. 5 is a plot showing transition frequency of an example tunable qubit device as a function of time.

FIG. 5 is a plot 500 showing the transition frequency of an example tunable qubit device as a function of time. The vertical axis represents a range of transition frequency values which are frequency values where the tunable qubit device operates, e.g., qubit operating frequency values, in GigaHertz (GHz), and the horizontal axis represents a time domain in nanoseconds (ns). The example tunable qubit device may be implemented as the tunable qubit device 302, 332 shown in FIGS. 3A, 3B or in another manner. The example curve 502 in FIG. 5 represents the transition frequency $\omega_{01}(t)$, e.g., the value of the $|0\rangle \rightarrow |1\rangle$ transition frequency of the example tunable qubit device over time in response to a control signal. For example, the control signal may be the flux modulation signal communicated to the tunable qubit device 302 on the flux bias control line 308A in FIG. 3A; the control signal may be the control signal under modulation communicated to the tunable qubit device 332 on the combined flux bias and qubit control line 338A in FIG. 3B. As shown, the transition frequency $\omega_{01}(t)$ is modulated, for example, at the modulation frequency $\omega_m$ in a range of 50-100 MHz, and varies between a minimum value of ~4.4 GHz and a maximal value of ~4.9 GHz.

FIG. 6 is a schematic diagram 600 showing energy levels defined by an example tunable qubit device of a quantum processing unit relative to a control signal under modulation. The schematic diagram 600 includes energy levels 604. The energy levels (which may define a qubit) 604 of the tunable qubit device include the ground state $|0\rangle$ and the first excited state $|1\rangle$. In this example, the energy of the ground state $|0\rangle$ is less than the energy of the first excited state $|1\rangle$. The diagram 600 shows a transition between the ground state $|0\rangle$ and the first excited state $|1\rangle$ at a transition frequency ($\omega_{01}$). The example tunable qubit device may be implemented as the tunable qubit device 302 or 332 shown in FIG. 3A, 3B. The schematic diagram 600 also includes an energy level 602 corresponding to a modulation frequency (am) of a control signal under modulation (e.g., the modulated control signal as described in FIG. 3B). The control signal under modulation when applied on the tunable qubit device can modulate the transition frequency of the tunable qubit device. When the modulation frequency is an odd subharmonic of an average qubit operating frequency ($\bar{\omega}_{01}$) over a duration of the control signal, e.g., $\bar{\omega}_{01}=(2n+1)\omega_m$ where n is a positive integer, the same control signal under modulation can be used to drive the population exchange (e.g., between the ground state $|0\rangle$ and the first excited state $|1\rangle$) and to activate a single-qubit rotation. Interactions between the electromagnetic field provided by the control signal and the qubit defined by the tunable qubit device under coherent subharmonic oscillations may cause a population exchange between the ground state and the first excited state.

FIG. 7 is a plot 700 showing transition frequency (GHz) as a function of magnetic flux (flux quanta) applied to an example tunable qubit device of a quantum processing unit. The example tunable qubit device may be implemented as the example tunable qubit device 302, 332 of the superconducting quantum processing unit 300, 330 shown in FIGS. 3A-3B or in another manner. The magnetic flux can be applied by communication of a control signal from a control system to a flux bias element of a control line associated with the tunable qubit device. For example, the control signal may be implemented as the control signals 206 in FIG. 2, the flux modulation signal on the flux bias control line 308A in FIG. 3A, or the control signal on the combined flux bias and qubit control line 338A in FIG. 3B. In some implementations, the flux bias element upon receiving the control signal can generate and modulate the magnetic flux threading a superconducting circuit loop in the tunable qubit device, and tune the qubit operating frequency of the tunable qubit device.

As shown in FIG. 7, the plot 700 includes a curve 702 indicating that the transition frequency of the tunable qubit device varies as function of the magnetic flux applied to the tunable qubit device, e.g., to the respective superconducting circuit loops 318, 348 of the respective tunable qubit devices 302, 332. The transition frequency varies between a minimum frequency of ~3.3 and a maximal frequency of 4.6 GHz as the magnetic flux varies between 0 and $0.5\Phi_0$. Dots 706 represent the data and line 702 is obtained from the model.

The plot 700 includes a point 704 representing a reference frequency that is used to determine the modulation frequency of the magnetic flux and to construct an example parametrically activated single-qubit quantum logic gate. The point 704 has a reference frequency value which can be defined by the average qubit operating frequency $600\mathbf{1}$ over a duration of the control signal. In certain examples, the reference frequency value may be determined or obtained in another manner. The plot 700 also includes vertical lines 710, 712 showing an example range of magnetic flux applied to the tunable qubit device when the transition frequency of the tunable qubit device is modulated. The separation between the two vertical lines 710, 712 indicates the modulation amplitude $\Phi_m$. In some implementations, when the magnetic flux threading the superconducting circuit loop of the tunable qubit device is modulated, the transition frequency of the tunable qubit device 302 is also modulated. In some implementations, when the magnetic flux is modulated with the modulation frequency equal to the odd harmonic of the transition frequency, e.g., $\bar{\omega}_{01}=(2n-1)\omega_m$, where n is a positive integer, the control signal that is used to cause the flux bias element to generate the magnetic flux can activate a single-qubit rotation on a qubit defined by the tunable qubit device. In some implementations, the modulation frequency of the magnetic flux and the modulation frequency of the control signal are the same. In other words, the control signal can be used to tune the transition frequency of the tunable qubit device and perform the single-qubit quantum logic gate on the superconducting quantum processing unit.

Figure 8:
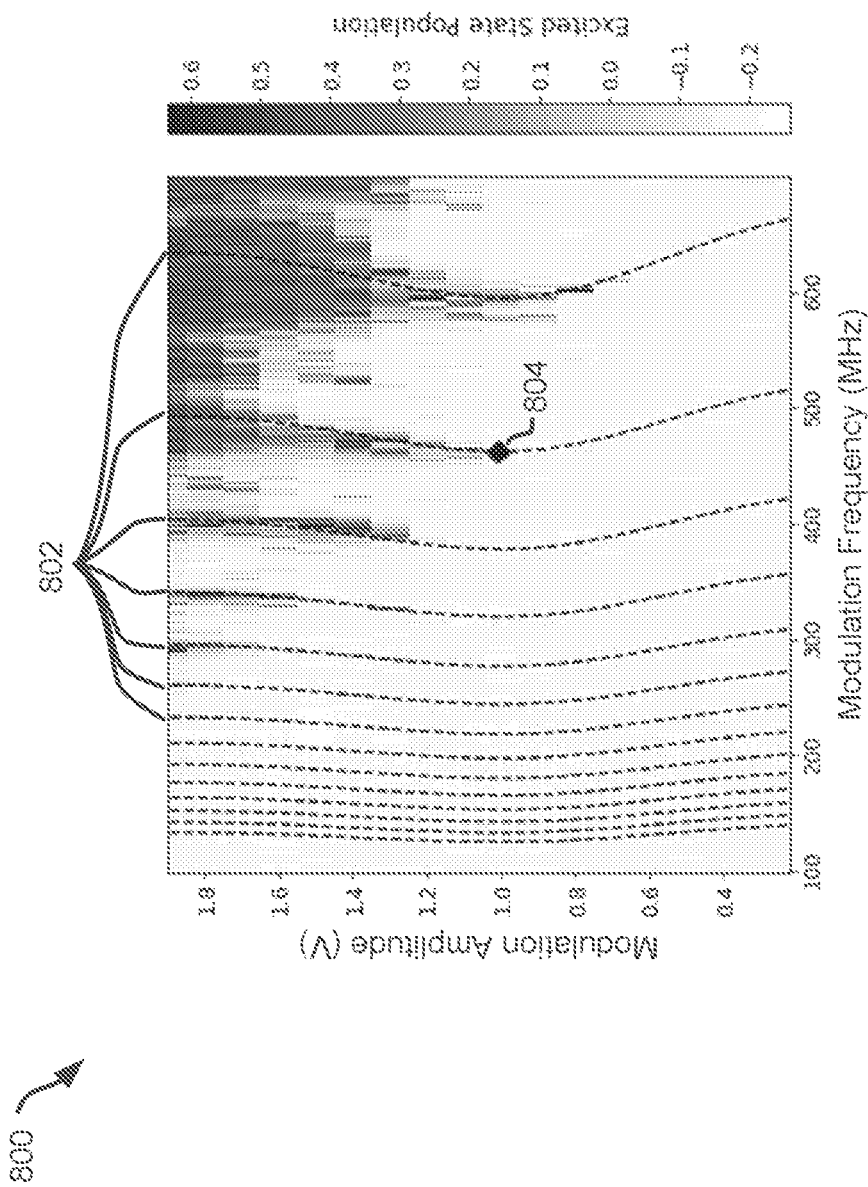
FIG. 8 is a plot showing population exchange between a control line and an example tunable qubit device in a superconducting quantum processing unit as a function of modulation amplitude in Volt (V) and modulation frequency in Megahertz (MHz) of a control signal.

FIG. 8 is a plot 800 showing population exchange between two energy levels |0⟩ and |1⟩ in a superconducting quantum processing unit as a function of modulation amplitude in Volt (V) and modulation frequency in Megahertz (MHz) of a control signal. The plot 800 is created by performing a rabi experiment with fixed time. The modulation amplitude (y-axis) is normalized. The plot 800 illustrates responses of the tunable qubit device to the applied control signal under modulation showing subharmonic resonance using a combined flux bias and qubit control line. The plot 800 includes fourteen dashed lines 804 representing resonance conditions for odd subharmonics. As shown in FIG. 8, the resonance, where the population exchange reaches a local maximal value, occurs at when the modulation frequency equals to or gets close to the odd subharmonics of an average qubit operating frequency. The spot 804 represents a desired flux bias operating point.

Once a desired flux bias operating point (modulation frequency and modulation amplitude) is found, further optimization of the population swapping is performed through a time rabi experiment. In some instances, the modulation frequency of the magnetic flux can be optimized according to the plot 1000 shown in FIG. 10 or in another manner; and the flux pulse duration can be optimized according to the plot 900 shown in FIG. 9. In some instances, Z gates can be optimized to adjust the phase of the desired states.

Figure 9:
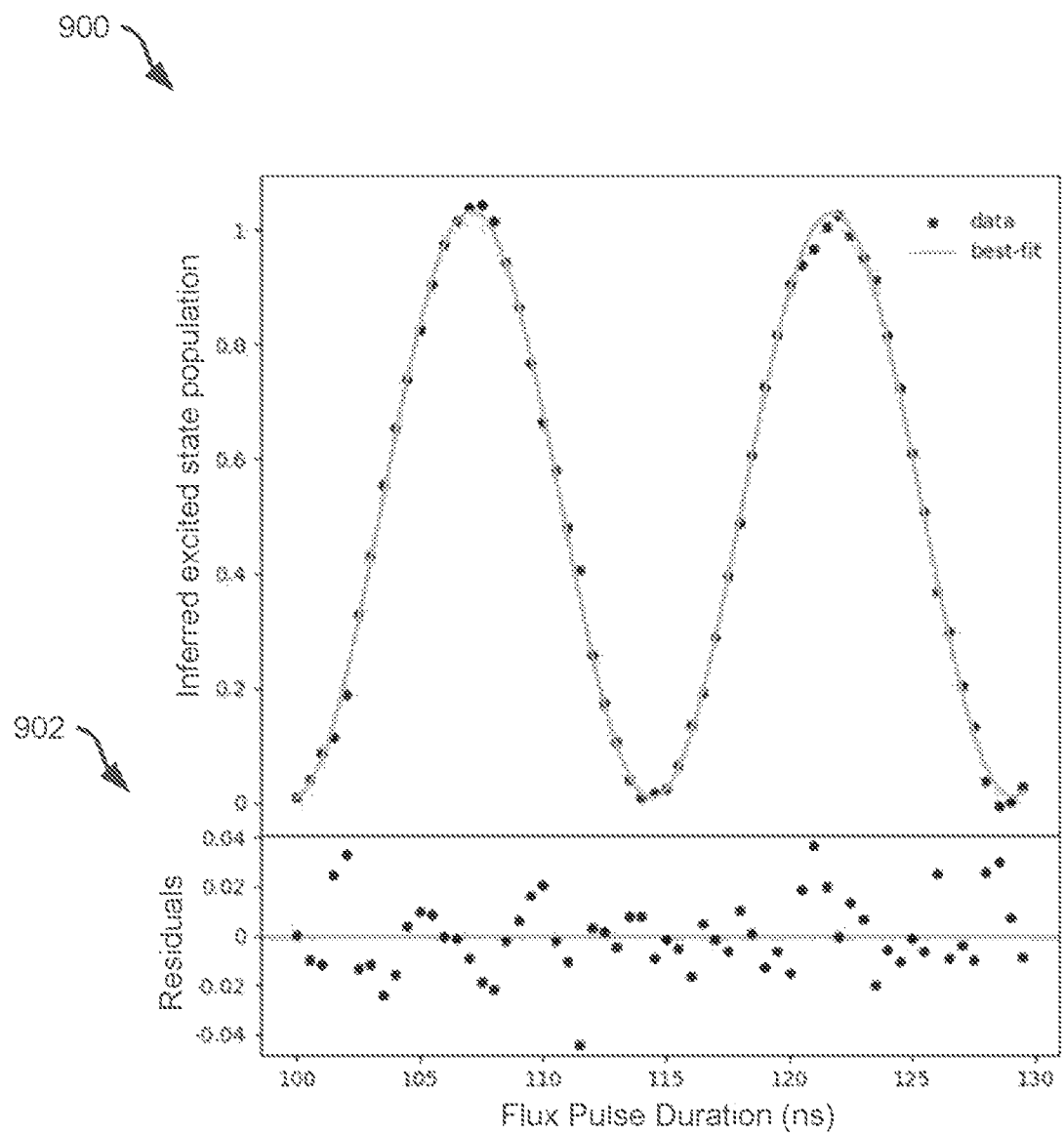
FIG. 9 are a plot of normalized inferred excited state population and a plot of residuals as functions of flux pulse duration (ns) for an example single-qubit quantum logic gate.

FIG. 9 are a plot 900 of normalized inferred excited state population and a plot 902 of residuals as functions of flux pulse duration (ns) for an example single-qubit quantum logic gate. The plots 900, 902 are obtained by communicating one or more control signals to a tunable qubit device through one or more control lines. For example, the control signal is modulated having a modulation frequency of 640 MHz and a modulation amplitude of 1.2 V. As shown in FIG. 9, the normalized inferred excited state population oscillates between 0 and 1, e.g., Rabi Oscillations. The qubit operating frequency of the tunable qubit device was also independently measured, which equals to 5,138.99±0.207 MHz, e.g., $f_{01}$=5,138.99±0.207 MHz. As shown in FIG. 9, dots represent measured data and curve in solid line is the best fit line for the measured data. The residuals shown in the plot 902 is determined by computing the difference between the inferred excited state population of the measured data and the inferred excited state population of the best fit line at the same flux pulse duration.

Figure 10:
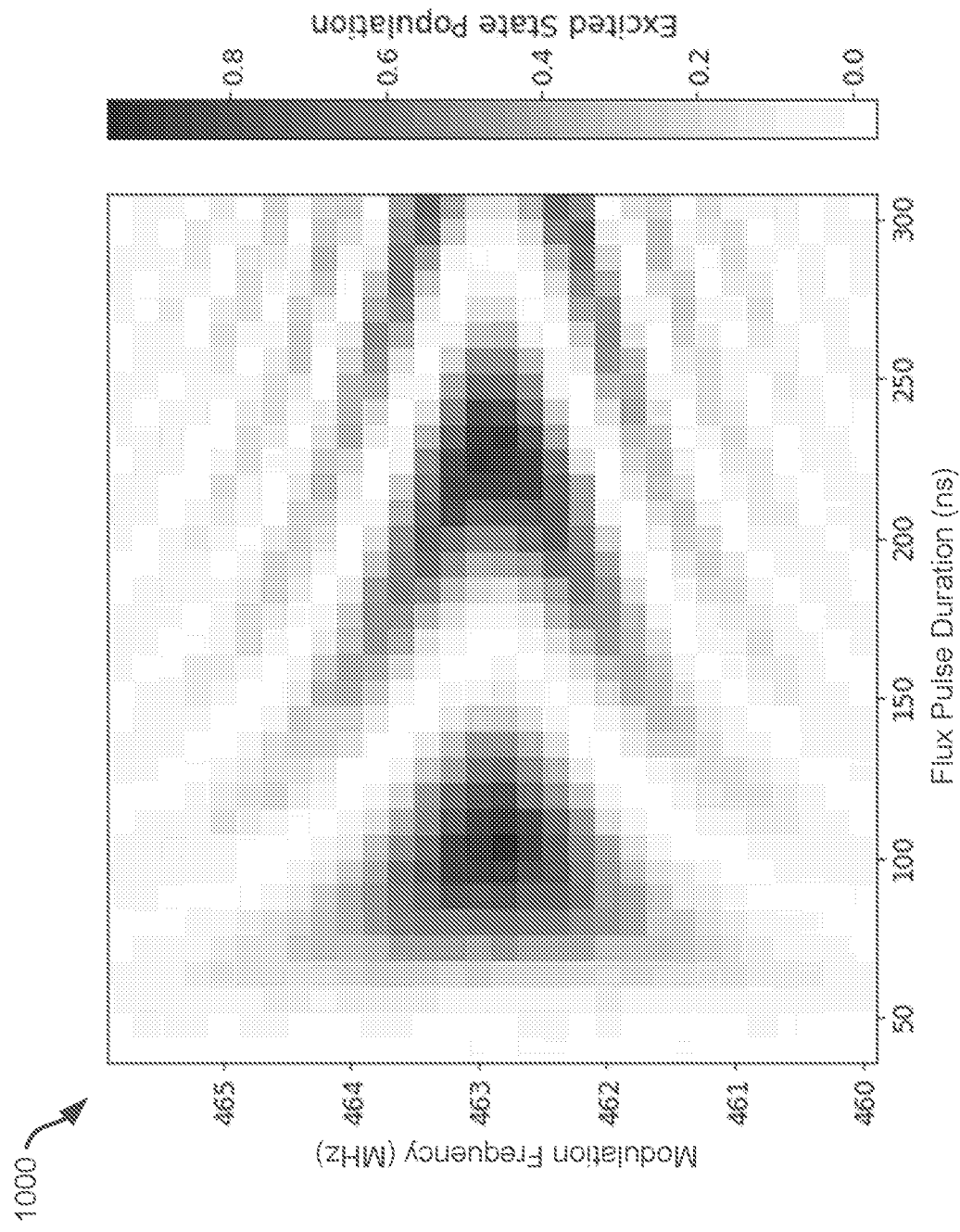
FIG. 10 is a plot showing excited state visibility as a function of modulation frequency (MHz) and flux pulse duration (ns) of a control signal.

FIG. 10 is a plot 1000 showing excited state population as a function of modulation frequency of the magnetic flux (MHz) and flux pulse duration (ns) of a control signal. In some implementations, the control signal may be implemented as the control signal communicated on the control line 338A associated with the tunable qubit device 332 in FIG. 3B. In some implementations, the control signal is modulated and applied to the tunable qubit device can activate a single-qubit quantum logic gate on a qubit defined by the tunable qubit device. In some implementations, FIG. 10 can be obtained after a desired flux bias operating point is determined by performing an optimization of the population swapping through a time rabi experiment. Particularly, a time rabi experiment is performed by holding modulation amplitude fixed and sweeping the time axis about a small range of modulation frequencies around the flux bias operating point 804 as shown in FIG. 8.

Figure 11:
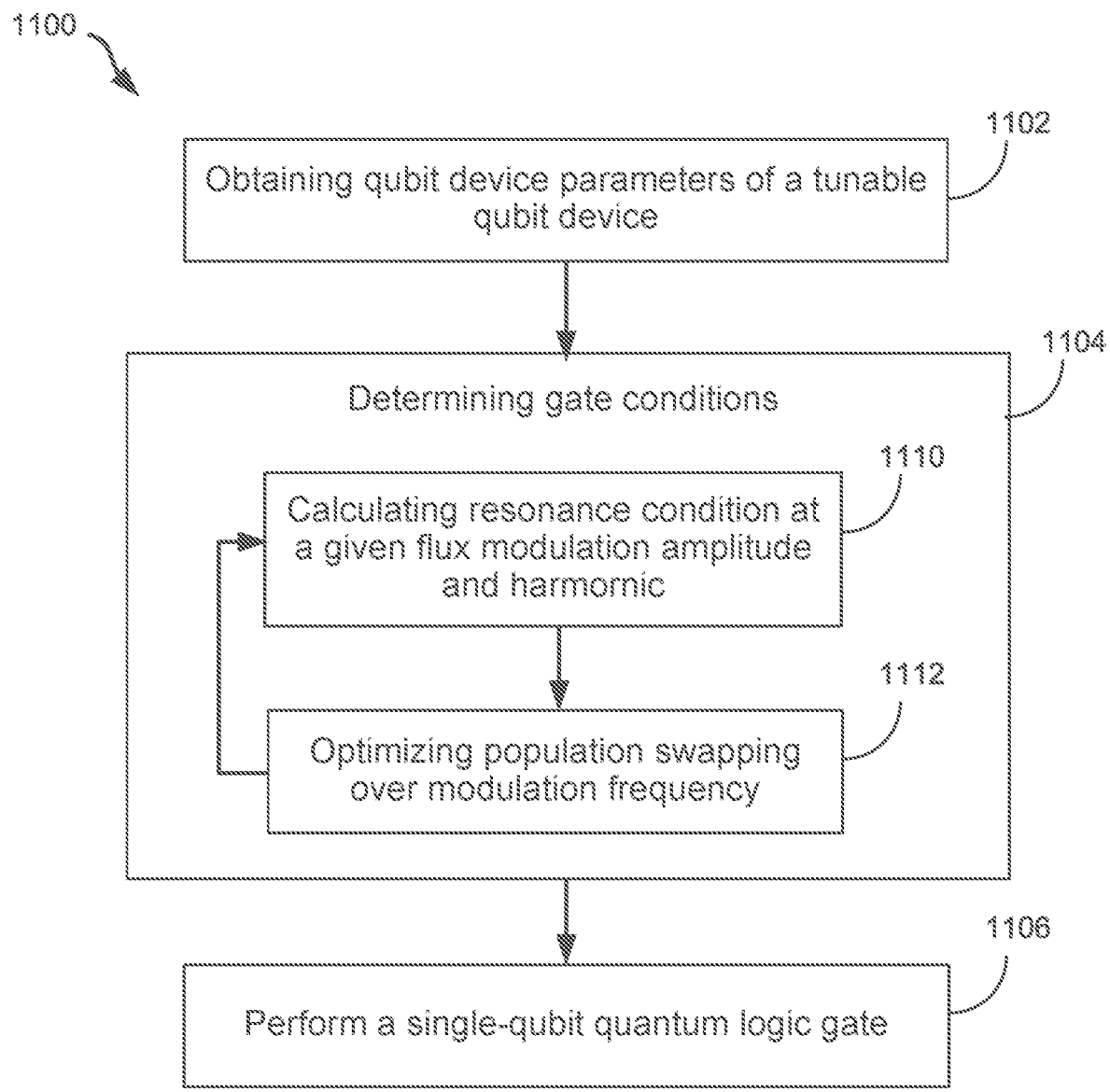
FIG. 11 is a flowchart showing aspects of an example process.

FIG. 11 is a flow chart showing aspects of an example process 1100. The example process 1100 can be used, for example, to operate a quantum processing unit. For instance, the example process 1100 may be used for performing a parametrically activated single-qubit quantum logic gate. In certain instances, the example process 1100 can be used for determining parameters of a control signal applied to a tunable qubit device in a superconducting quantum processing unit, for example, modulation frequencies and modulation amplitude. The control signals can be implemented as the control signals communicated to the quantum processing unit 204 in FIG. 2 or the tunable qubit devices 302, 332 in the superconducting quantum processing units 300, 330 shown in FIGS. 3A-3B. In some implementations, the quantum processing unit may include other superconducting quantum circuit devices, for example, readout resonator devices, flux bias devices, control lines, connections (e.g., capacitive coupling, galvanic coupling, inductive coupling, or combinations thereof). The example process 1100 may include additional or different operations, and the operations can be performed in the order shown or in another order.

In some implementations, one or more operations in the example process 1100 can be performed by a computer system, for instance, by a digital computer system having one or more digital processors (e.g., a microprocessor or other data processing apparatus) that execute instructions (e.g., instructions stored in a digital memory or other computer-readable medium), or by another type of digital, quantum or hybrid computer system. As an example, in some cases the quantum processing unit can be deployed as the quantum processing unit 102 shown in FIG. 1, and operations in the example process 1100 shown in FIG. 11 can be controlled, executed, or initiated by one or more components of the control system 110 shown in FIG. 1.

At 1102, qubit device parameters are obtained. In some implementations, the qubit device parameters of the tunable qubit device in the superconducting quantum processing unit are determined by performing a measurement or characterization process, a calibration process, a tune-up process, or another type of process. For example, a calibration process can be executed in the superconducting quantum processing unit to obtain the qubit device parameters of each of the tunable qubit devices in a device array. In some instances, a calibration process can characterize a particular tunable qubit device that a single-qubit quantum logic gate operation is to be applied to. In certain examples, the process for obtaining the qubit device parameters of the tunable qubit device is executed by the control system 202 of FIG. 2 or by another component in a computing system (e.g., the computing system 101). In some instances, the qubit device parameters may be predetermined using another process, which can be stored and obtained in another manner.

In some implementations, the qubit device parameters may include one or more of the qubit device parameters of the tunable qubit device in the superconducting quantum processing unit. For example, qubit device parameters, such as the drive frequency, a range of qubit operating frequencies (e.g., minimum and a maximum transition frequencies $\omega_{01}^{min}$ and $\omega_{01}^{max}$ as shown in Equations 1-2), a maximum transition frequency $f_{12_{max}}$, and an anharmonicity ($\eta$) of the tunable qubit device at the maximum transition frequency $f_{12_{max}}$ qubit device parameters, e.g., $f_{12_{max}}$ and the anharmonicity ($\eta$) at $f_{12_{max}}$, can be used to characterize the qubit implementation beyond the lowest two states.

In certain instances, circuit parameters of circuit components in an equivalent circuit representing the superconducting quantum processing unit can be obtained based on the qubit device parameters. For example, the circuit parameters, such as, the Josephson junction energies $E_{J1}$, $E_{J2}$ of the two Josephson junctions 312/314 or 342/344 in the respective superconducting circuit loop 318 or 348, and the charging energy $E_C$ of the shunt capacitor 316 or 346 of the tunable qubit device 300 or 310, can be calculated according to Equations 5-6 or in another manner.

In some examples, the qubit operating frequency is measured by using qubit spectroscopy to measure the transition frequency from the ground state $|0\rangle$ to the first excited state $|1\rangle$ of the tunable qubit device. Ramsey interferometry can then be used to fine tune the value of the qubit operating frequency obtained from the spectroscopic measurement. In some instances, the qubit operating frequency can be measured at one or more reference values of the applied magnetic flux. For example, the qubit operating frequency of a tunable qubit device can be measured at zero flux and one-half flux quantum; the tunable qubit devices may be measured under other flux conditions.

In some examples, after the qubit operating frequencies of the tunable qubit device are obtained, qubit spectroscopy can be used to measure the transition frequency from the ground state $|0\rangle$ to the second excited state $|2\rangle$ which can be used to calculate the anharmonicity of the tunable qubit device. For instance, the anharmonicity of a tunable qubit device may be computed as $\eta = 2\omega_{01} - \omega_{02}$, where $\omega_{01}$ represents the transition frequency from the ground state $|0\rangle$ to the first excited state $|1\rangle$ of the tunable qubit device, and $\omega_{02}$ represents the transition frequency from the ground state $|0\rangle$ to the second excited state $|2\rangle$ of the tunable qubit device.

In some implementations, operation 1102 provides one or more of the following parameters, for example, as an output value that can be fed forward to another operation in the process 1100. When control signals are communicated to the tunable qubit device using separate control lines (e.g., the flux bias control line 308A and the qubit drive line 308B as shown in FIG. 3A), operation 1102 can provide the drive frequency of the tunable qubit device. In this case, a parking value of the flux bias voltage can be used to determine the drive frequency.

At 1104, gate conditions are determined. In some implementations, a control signal includes a flux modulation signal which can be communicated to the tunable qubit device on a flux bias control line. The flux modulation signal can be formed according to modulation parameters determined during operation 1104. In certain instances, the control signal also includes a drive signal which can be communicated to the tunable qubit device on a distinct qubit drive control line to activate a single-qubit quantum logic gate. Control signals (e.g., flux modulation signal and the drive signal) can be characterized by control parameters including modulation signal parameters such as a DC bias $\Phi_{dc}$, a modulation amplitude $\Phi_{ac}$, a modulation frequency $f_m$, a modulation phase $\theta_m$, and drive signal parameters, such as a drive amplitude $\omega_d$, a drive frequency $f_d$, and a drive phase $\theta_d$.

In some instances, a parking value of the magnetic flux caused by the control signal corresponding to the tunable qubit device in the superconducting quantum processing unit being tuned at an AC sweet spot is determined. In certain examples, the qubit device parameters obtained from operation 1102 (e.g., the qubit operating frequency) can be used to determine the parking value of the magnetic flux. For example, Ramsey experiments can be performed with an applied flux modulation frequency and amplitude. The amplitude of the flux modulation is varied to measure the detuning of the average qubit frequency under modulation ($\overline{f}_{01}$). Modulation signal parameters of a flux modulation signal communicated to a flux bias element associated with the tunable qubit device are measured under an operating condition of the quantum processing unit. In this example, the operating condition includes a flux modulation applied to the tunable qubit device. For example, the flux modulation can be the type of flux modulation that is applied by a flux modulation signal delivered to a flux bias control line associated with the tunable qubit device. In some cases, the flux modulation is specified at a modulation frequency applied to a superconducting circuit loop that defines a flux quantum $\Phi_0$ of the tunable qubit device. In some cases, the flux modulation is the type that applies a parametrically-activated single-qubit quantum logic gate.

In some implementations, during operation 1104, the frequency shift of the tunable qubit device is measured under flux modulation applied to the tunable qubit device. Driving the magnetic flux applied to the tunable qubit device with a flux modulation pulse can shift the average qubit frequency of the tunable qubit device away from the "parking" frequency with a frequency shift (e.g., $\delta\omega$). The magnitude of the frequency shift is a function of the voltage amplitude V of the flux modulation signal. The frequency shift measurements may correspond to a range of modulation amplitudes of the flux modulation. For example, the frequency shift $\delta\omega$ (or equivalently, the average qubit operating frequency $\overline{\omega}_{01}$) may be a function of the voltage amplitude V of the flux modulation pulse, and the frequency shift Sa (or equivalently, the average qubit operating frequency $\overline{\omega}_{01}$) may be measured for multiple distinct values of the voltage amplitude V, which correspond to multiple distinct values over a range of flux modulation amplitudes.

In some examples, the frequency shift (e.g., $\delta\omega$) can be measured by performing a Ramsey interferometry measurement, with a voltage amplitude V applied during the wait time t. The wait time t is part of the Ramsey interferometry sequence used to determine an appropriate voltage amplitude V. The wait time t is the time under which the qubit is allowed to process on the bloch sphere equator under the applied modulation tone. Sweeping the time and mapping out Ramsey fringes allows one to resolve the average change in qubit frequency induced by the modulation tone. The Ramsey interferometry measurement can be repeated for a range of voltage amplitudes V of the flux modulation pulse to obtain the frequency shift (e.g., $\delta\omega$).

In some implementations, during operation 1104, a transfer function calibration process is performed. In some implementations, a flux bias control line transfer function is measured by performing modified Ramsey experiments that measure the mean frequency shift as a function of drive frequency at a fixed drive amplitude. For instance, the modified Ramsey experiment can replace the free evolution time between the X/2 pulses with a time varying modulated flux pulse of fixed frequency and amplitude. The mean frequency shift can serve as a proxy for the applied voltage on chip, providing a transfer function curve that can be corrected for (e.g., to ensure the applied voltage is constant as a function of frequency). In implementations where operation 1104 is performed, the results may be used later in the process 1100 (e.g., at 1112) and generally may improve the accuracy of the initial values for optimal gate parameters calculated at 1110. In some implementations, operation 1104 provides a transfer function of output amplitude as a function of output frequency, for example, as an output value that can be fed forward to another operation in the process 1100.

In some implementations, during operation 1104, multiple distinct gate conditions for applying a single-qubit quantum logic gate to the qubit defined by the tunable qubit device can be computed. In some instances, each distinct gate condition has a different set of gate parameters. In some cases, the multiple distinct gate conditions are computed for a range of flux modulation amplitudes, and each distinct gate condition includes a modulation amplitude and a harmonic (n). In some instances, other gate conditions may be computed, for example, a modulation frequency, and/or a modulation time (e.g., a duration of the flux modulation). As shown in FIG. 11, operation 1104 includes sub-steps 1110 and 1112. In some instances, the operation 1104 may include additional or different sub-steps, including operations performed by additional or different components, and the operations may be performed in the order shown or in another order.

At 1110, resonance conditions are calculated. Resonance conditions are calculated at a given flux modulation amplitude value and a harmonic value. To calculate a resonance condition, the values of the modulation amplitude and modulation frequency are determined, for example, when a maximum population exchange occurs or from the qubit device parameters and the tunable qubit model.

In some implementations, the modulation frequency $f_m$ is computed within an AC frequency band (sub-GHz) at which a single-qubit rotation is activated. In some instances, the AC frequency band is below the range of the qubit operating frequency of the tunable qubit device. In some instances, the resonance condition may be calculated as a function of flux modulation amplitude (which varies $\bar{f}_{01}$), and the applied modulation frequency in the resonance conditions can be also determined. In some implementations, rabi oscillation measurements of qubit population transfer are performed over a range of the modulation frequencies and a range of the modulation amplitudes. In some implementations, operation 1104 can output results in forms of the example plot shown in FIG. 8 or in another manner.

At 1112, population swapping is optimized. In some implementations, the population swapping can be optimized with pulse frequency, amplitude, and duration, measured with standard qubit readout. In some implementations, optimization of the population swapping can be achieved by performing a Rabi measurement, e.g., measuring the population swapping as a function of both modulation amplitude and modulation frequency (e.g., as shown in FIG. 8). In some implementations, optimization of the population swapping can be achieved by measuring qubit population as a function of rabi time. This is done iteratively for many frequency and amplitude conditions.

In some cases, sub-steps 1110, 1112 (and possibly other operations) within operation 1104 are executed as an iterative process, where each iteration includes determining, based on the current set of qubit device parameters, a resonance condition for the tunable qubit device at a given flux modulation amplitude value and a harmonic value (at 1110); and optimizing population swapping over modulation frequency (at 1112). The next iteration is then performed at a different flux modulation amplitude value and a different harmonic value. When calculations of gate conditions at all combinations of flux modulation amplitude values and harmonic values are completed, the iterative process can terminate (e.g., and the process 1100 can then proceed to 1110). Each iteration of the iterative process may include additional operations and parameter evaluations. Each iteration of the iterative process may include additional operations and parameter evaluations.

At 1106, a single-qubit quantum logic gate is performed. In some implementations, the flux modulation signal is formed according to the optimized modulation signal parameters, by operation of a control system; and applied to the tunable qubit device. The flux modulation signal with the optimized modulation signal parameters can drive the qubit defined by the tunable qubit device and perform the single-qubit quantum logic gate.

In some implementations, in order to perform the single-qubit quantum logic gate on the qubit defined by the tunable qubit device, one or more control signals are communicated from the control system to the tunable qubit device. The tunable qubit device has a range of qubit operating frequencies. In some instances, the range of qubit operating frequencies is determined with respect to operation 1102. The range of qubit operating frequencies includes a minimum frequency which is greater than 1 GigaHertz. The one or more control signals communicated to the tunable qubit device include only frequency components that are below the range of qubit operating frequencies. The one or more control signals with only low-frequency components are easy to produce and modify with lower control overhead and power consumption. The single-qubit quantum logic gate based on such control signals can reduce reflection and improve impedance matching across high-temperature gradients.

The one or more control signals, when being communicated to the tunable qubit device drives the tunable qubit device at a drive frequency below the minimum frequency of the range of qubit operating frequencies. In some implementations, the tunable qubit device has an average qubit operating frequency over a duration of the one or more control signals. The one or more control signals, when being communicated to the tunable qubit device, drive the tunable qubit device at a drive frequency equal to a subharmonic of the average qubit operating frequency. In some instances, the one or more control signals include a drive signal and a flux modulation signal, and the flux modulation signal includes a modulation frequency equal to a subharmonic of the average qubit operating frequency shifted by the drive signal.

In some implementations, the tunable qubit device includes a superconducting circuit loop and a flux bias element that applies a magnetic flux to the superconducting circuit loop. When the one or more control signals are communicated to the tunable qubit device, a flux modulation signal is communicated to the flux bias element; and the flux modulation signal includes only frequencies that are below the range of qubit operating frequencies. The flux modulation signal is defined by the modulation signal parameters (e.g., a modulation frequency and a modulation amplitude), and values of the modulation signal parameters (e.g., values of the modulation frequency and the modulation amplitude) are determined by operation of the control system. In some implementations, the value of the modulation frequency and the value of the modulation amplitude can be determined by calculating the resonance conditions and optimized by optimizing the population swapping. In some instances, the population swapping is optimized by performing a Rabi measurement of qubit population transfer over a range of the modulation frequency and a range of the modulation amplitude as described in operation 1112.

The tunable qubit device further includes a drive line. When the one or more control signals are communicated to the tunable qubit device, a drive signal is communicated to the drive line; and the drive signal includes only frequencies that are below the range of qubit operating frequencies.

In some implementations, a local Z rotation is optimized. A local Z rotation is calibrated and corrected. For example, RZ single qubit phases can be calibrated and corrected for tuning up +x, +x/2, and +y/2 pulses using standard calibration techniques. In some implementations, a gate fidelity of a single-qubit quantum logic gate is measured or benchmarked, for example, using ALLXY and simultaneous randomized benchmarking.

In a general aspect, a parametrically activated single-qubit quantum logic gate is performed in a quantum computing system.

In a first example, a superconducting quantum processing unit includes a tunable qubit device. A single-qubit quantum logic gate is performed on a qubit defined by the tunable qubit device by communicating one or more control signals from a control system to the tunable qubit device. The tunable qubit device has a range of qubit operating frequencies, and the one or more control signals include only frequencies that are below the range of qubit operating frequencies.

Implementations of the first example may include one or more of the following features. The range of qubit operating frequencies includes a minimum frequency greater than 1 GigaHertz (GHz), and when the one or more control signals are communicated to the tunable qubit device, the tunable qubit device is driven at a drive frequency below the minimum frequency. The tunable qubit device has an average qubit operating frequency over a duration of the one or more control signals, and when the one or more control signals are communicated to the tunable qubit device, the tunable qubit device is driven at a drive frequency equal to a subharmonic of the average qubit operating frequency. The tunable qubit device has an average qubit operating frequency over a duration of the one or more control signals. The one or more control signals include a drive signal and a flux modulation signal, and the flux modulation signal includes a modulation signal frequency equal to a subharmonic of the average qubit operating frequency shifted by the drive signal.

Implementations of the first example may include one or more of the following features. The tunable qubit device includes a superconducting circuit loop, and a flux bias element that applies a magnetic flux to the superconducting circuit loop. When the one or more control signals are communicated to the tunable qubit device, a flux modulation signal is communicated to the flux bias element; and the flux modulation signal comprises only frequencies that are below the range of qubit operating frequencies. The tunable qubit device further includes a drive line; when the one or more control signals are communicated to the tunable qubit device, a drive signal is communicated to the drive line; and the drive signal comprises only frequencies that are below the range of qubit operating frequencies. The flux modulation signal is defined by a modulation signal frequency and a modulation signal amplitude, and the method comprises determining, by operation of the control system, a value of the modulation signal frequency and a value of the modulation signal amplitude. When the value of the modulation signal frequency and the value of the modulation signal amplitude are determined, Rabi oscillation measurements of qubit population transfer are performed over a range of the flux modulation frequency and a range of the flux modulation amplitude. When the value of the modulation signal frequency and the value of the modulation signal amplitude are determined, the value of the modulation signal frequency and the value of the modulation signal amplitude are optimized.

Implementations of the first example may include one or more of the following features. The superconducting circuit loop includes two Josephson junctions, and the tunable qubit device includes a shunt capacitor in parallel with each of the two Josephson junctions. The range of qubit operating frequencies of the tunable qubit device is defined at least in part by Josephson energies of the two Josephson junctions and a capacitance of the shunt capacitor. The tunable qubit device includes a tunable transmon device.

In a second example, a quantum computing system includes a superconducting quantum processing unit and a control system. The superconducting quantum processing unit includes a tunable qubit device. The control system is communicably coupled to the superconducting quantum processing unit and is configured to perform one or more operations of the first example.

In a third example, a quantum computing system includes means for performing a single-qubit quantum logic gate. The quantum computing system includes a superconducting quantum processing unit comprising a tunable qubit device. The tunable qubit device has a range of qubit operating frequencies. The quantum computing system includes a means for performing a single-qubit quantum logic gate on a qubit defined by the tunable qubit device. The single-qubit quantum logic gate is performed by communicating one or more control signals to the tunable qubit device, and the one or more control signals comprise only frequencies that are below the range of qubit operating frequencies.

Implementations of the third example may include one or more of the following features. The means for performing the single-qubit quantum logic gate comprises a control system that is communicably coupled to the superconducting quantum processing unit. The control system may be configured to perform some or all of the operations of the example process 1100 shown in FIG. 11. The control system is configured to identify signal parameters for the single-qubit quantum logic gate; generate the one or more control signals according to the signal parameters; and communicate the one or more control signals to the tunable qubit device.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method of operating a superconducting quantum processing unit comprising a tunable qubit device, the method comprising:
performing a single-qubit quantum logic gate on a qubit defined by the tunable qubit device by communicating one or more control signals from a control system to the tunable qubit device, wherein the tunable qubit device has a range of qubit operating frequencies, and the one or more control signals comprise only frequencies that are below the range of qubit operating frequencies.

2. The method of claim 1, wherein the range of qubit operating frequencies comprises a minimum frequency greater than 1 GigaHertz, and communicating the one or more control signals comprises driving the tunable qubit device at a drive frequency below the minimum frequency.

3. The method of claim 1, wherein the tunable qubit device has an average qubit operating frequency over a duration of the one or more control signals, and communicating the one or more control signals comprises driving the tunable qubit device at a drive frequency equal to a subharmonic of the average qubit operating frequency.

4. The method of claim 1, wherein the tunable qubit device has an average qubit operating frequency over a duration of the one or more control signals, the one or more control signals comprise a drive signal and a flux modulation signal, and the flux modulation signal comprises a modulation frequency equal to a subharmonic of the average qubit operating frequency shifted by the drive signal.

5. The method of claim 1, wherein:
the tunable qubit device comprises:
a superconducting circuit loop, and
a flux bias element that applies a magnetic flux to the superconducting circuit loop; and
communicating the one or more control signals comprises communicating a flux modulation signal to the flux bias element; and
the flux modulation signal comprises only frequencies that are below the range of qubit operating frequencies.

6. The method of claim 5, wherein:
the tunable qubit device further comprises a drive line;
communicating the one or more control signals comprises communicating a drive signal to the drive line; and
the drive signal comprises only frequencies that are below the range of qubit operating frequencies.

7. The method of claim 5, wherein the flux modulation signal is defined by a modulation frequency and a modulation amplitude, and the method comprises determining, by operation of the control system, a value of the modulation frequency and a value of the modulation amplitude.

8. The method of claim 7, wherein determining the value of the modulation frequency and the value of the modulation amplitude comprises performing Rabi oscillation measurements of qubit population transfer over a range of the modulation frequency and a range of the modulation amplitude.

9. The method of claim 8, wherein determining the value of the modulation frequency and the value of the modulation amplitude further comprises optimizing the value of the modulation frequency and the value of the modulation amplitude.

10. The method of claim 5, wherein the superconducting circuit loop comprises two Josephson junctions, and the tunable qubit device comprises a shunt capacitor in parallel with each of the two Josephson junctions.

11. The method of claim 10, wherein the range of qubit operating frequencies of the tunable qubit device is defined at least in part by Josephson energies of the two Josephson junctions and a capacitance of the shunt capacitor.

12. The method of claim 1, wherein the tunable qubit device comprises a tunable transmon device.

13. A quantum computing system comprising:
a superconducting quantum processing unit comprising a tunable qubit device; and
a control system communicably coupled to the superconducting quantum processing unit, the control system configured to perform operations comprising:
performing a single-qubit quantum logic gate on a qubit defined by the tunable qubit device by communicating one or more control signals to the tunable qubit device, wherein the tunable qubit device has a range of qubit operating frequencies, and the one or more control signals comprise only frequencies that are below the range of qubit operating frequencies.

14. The system of claim 13, wherein the range of qubit operating frequencies comprises a minimum frequency greater than 1 GigaHertz, and communicating the one or more control signals comprises driving the tunable qubit device at a drive frequency below the minimum frequency.

15. The system of claim 13, wherein the tunable qubit device has an average qubit operating frequency over a duration of the one or more control signals, and communicating the one or more control signals comprises driving the tunable qubit device at a drive frequency equal to a subharmonic of the average qubit operating frequency.

16. The system of claim 13, wherein the tunable qubit device has an average qubit operating frequency over a duration of the one or more control signals, the one or more control signals comprise a drive signal and a flux modulation signal, and the flux modulation signal comprises a modulation frequency equal to a subharmonic of the average qubit operating frequency shifted by the drive signal.

17. The system of claim 13, wherein:
the tunable qubit device comprises:
a superconducting circuit loop, and
a flux bias element that applies a magnetic flux to the superconducting circuit loop; and
communicating the one or more control signals comprises communicating a flux modulation signal to the flux bias element; and
the flux modulation signal comprises only frequencies that are below the range of qubit operating frequencies.

18. The system of claim 17, wherein:
the tunable qubit device further comprises a drive line;
communicating the one or more control signals comprises communicating a drive signal to the drive line; and
the drive signal comprises only frequencies that are below the range of qubit operating frequencies.

19. The system of claim 17, wherein the flux modulation signal is defined by a modulation frequency and a modulation amplitude, and the method comprises determining, by operation of the control system, a value of the modulation frequency and a value of the modulation amplitude.

20. The system of claim 19, wherein determining the value of the modulation frequency and the value of the modulation amplitude comprises performing Rabi oscillation measurements of qubit population transfer over a range of the modulation frequency and a range of the modulation amplitude.

21. The system of claim 20, wherein determining the value of the modulation frequency and the value of the modulation amplitude further comprises optimizing the value of the modulation frequency and the value of the modulation amplitude.

22. The system of claim 17, wherein the superconducting circuit loop comprises two Josephson junctions, and the tunable qubit device comprises a shunt capacitor in parallel with each of the two Josephson junctions.

23. The system of claim 22, wherein the range of qubit operating frequencies of the tunable qubit device is defined at least in part by Josephson energies of the two Josephson junctions and a capacitance of the shunt capacitor.

24. The system of claim 13, wherein the tunable qubit device comprises a tunable transmon device.

25. A quantum computing system comprising:
  a superconducting quantum processing unit comprising a tunable qubit device, wherein the tunable qubit device has a range of qubit operating frequencies; and
  means for performing a single-qubit quantum logic gate on a qubit defined by the tunable qubit device,
  wherein the single-qubit quantum logic gate is performed by communicating one or more control signals to the tunable qubit device, and the one or more control signals comprise only frequencies that are below the range of qubit operating frequencies.

26. The system of claim 25, wherein the means for performing the single-qubit quantum logic gate comprises a control system that is communicably coupled to the superconducting quantum processing unit and configured to:
  identify signal parameters for the single-qubit quantum logic gate;
  generate the one or more control signals according to the signal parameters; and
  communicate the one or more control signals to the tunable qubit device.

* * * * *

UNITED STATES PATENT AND TRADEMARK OFFICE
CERTIFICATE OF CORRECTION

PATENT NO. : 12,387,125 B1
APPLICATION NO. : 17/859823
DATED : August 12, 2025
INVENTOR(S) : Reagor et al.

It is certified that error appears in the above-identified patent and that said Letters Patent is hereby corrected as shown below:

In the Specification

Column 13, Detailed Description, Line 49 Delete "a" and insert -- $\omega$ -- therefor Column 15, Detailed Description, Line 47 Delete "$\omega_{01}$," and insert -- $\bar{\omega}_{01}$, -- therefor Column 16, Detailed Description, Line 60 Delete "X," and insert -- $X\pi$ -- therefor Column 17, Detailed Description, Line 40 Delete "da," and insert -- $\delta\omega$, -- therefor Column 18, Detailed Description, Line 2 Delete "da," and insert -- $\delta\omega$, -- therefor Column 20, Detailed Description, Line 37 Delete "$|0\rangle \, |1\rangle$" and insert -- $|0\rangle \rightarrow |1\rangle$ -- therefor Column 20, Detailed Description, Line 64 Delete "Cc." and insert -- $C_c$. -- therefor Column 21, Detailed Description, Line 42 Delete "Hamitonian" and insert -- Hamiltonian -- therefor Column 22, Detailed Description, Line 5 Delete "$f_d$," and insert -- $f_d$. -- therefor Column 23, Detailed Description, Line 55 Delete "$\omega_d=\omega_m$," and insert -- $\Omega_d = \Omega_m$, -- therefor Column 26, Detailed Description, Line 2 Delete "(am)" and insert -- ($\omega_m$) -- therefor Column 26, Detailed Description, Line 52 Delete "6001" and insert -- $\bar{\omega}_{01}$ -- therefor Column 27, Detailed Description, Line 10 Delete "$|0)$" and insert -- $|0\rangle$ -- therefor Signed and Sealed this
Twenty-eighth Day of October, 2025

John A. Squires
*Director of the United States Patent and Trademark Office*

CERTIFICATE OF CORRECTION (continued)
U.S. Pat. No. 12,387,125 B1

Column 28, Detailed Description, Line 37 Delete "110" and insert -- 105 -- therefor Column 29, Detailed Description, Line 58 Delete "$\omega_d$," and insert -- $\Omega_d$, -- therefor Column 30, Detailed Description, Line 30 Delete "$\delta\omega$(or" and insert -- $\delta\omega$ (or -- therefor Column 30, Detailed Description, Line 33 Delete "Sa (or" and insert -- $\delta\omega$ (or -- therefor